US009176649B2

(12) United States Patent
Ayanam et al.

(10) Patent No.: US 9,176,649 B2
(45) Date of Patent: Nov. 3, 2015

(54) METHOD AND APPARATUS OF REMOTE MANAGEMENT OF COMPUTER SYSTEM USING VOICE AND GESTURE BASED INPUT

(71) Applicant: American Megatrends, Inc., Norcross, GA (US)

(72) Inventors: Varadachari Sudan Ayanam, Suwanee, GA (US); Samvinesh Christopher, Suwanee, GA (US)

(73) Assignee: AMERICAN MEGATRENDS, INC., Norcross, GA (US)

( * ) Notice: Subject to any disclaimer, the term of this patent is extended or adjusted under 35 U.S.C. 154(b) by 406 days.

(21) Appl. No.: 13/843,820

(22) Filed: Mar. 15, 2013

(65) Prior Publication Data

US 2014/0282045 A1 Sep. 18, 2014

(51) Int. Cl.
*G06F 13/00* (2006.01)
*G06F 3/0484* (2013.01)

(52) U.S. Cl.
CPC .................................. *G06F 3/0484* (2013.01)

(58) Field of Classification Search
CPC .............. H04L 29/08072; H04L 29/06; H04L 29/08981; H04L 12/403; H04L 12/2803; G08B 25/10; G08B 25/08; G08B 1/08; G08B 25/009; G06F 3/0484; A61B 5/0002

USPC .......................................... 340/531; 709/208
See application file for complete search history.

(56) References Cited

U.S. PATENT DOCUMENTS

| 5,832,440 A | * | 11/1998 | Woodbridge et al. | 704/275 |
|---|---|---|---|---|
| 7,529,677 B1 | * | 5/2009 | Wittenberg | 704/275 |
| 2003/0167171 A1 | * | 9/2003 | Calderone et al. | 704/270 |
| 2005/0035855 A1 | * | 2/2005 | Sarnowsky | 340/531 |
| 2014/0253466 A1 | * | 9/2014 | Brewer | 345/173 |

* cited by examiner

*Primary Examiner* — Robert B Harrell
(74) *Attorney, Agent, or Firm* — Locke Lord LLP; Tim Tingkang Xia, Esq.

(57) ABSTRACT

Method, application, and medium of remote management of a computer system using voice and gesture based input are disclosed. An application module is executed on a processor of a computing device. The application module (a) displays a first user interface on the computing device, the interface allowing a user to enter a first input which includes at least one of a voice input and a gesture input, (b) receives input data which include at least one of audio input data and multitouch input data from the computing device representing the first input, (c) determines, based on the input data, a first command from a plurality of commands targeted to a baseboard management controller (BMC) managing a computer system, (d) constructs a first message including the determined command, and (e) sends the first message to the BMC over a network.

25 Claims, 14 Drawing Sheets

750

MANAGEMENT APPLICATION

SENSOR DETAILS:

Sensor: CPU1 TEMP

Reading: 26.00 C°

Sensor Type: Temperature

SENSOR Number: 82 (0x52)

Thresholds:

LNC: -5.00

LCR: -8.00

LNR: -11.00

UNC: 90.00

UCR: 93.00

UNR: 96.00

Status: 0x19c0

FIG. 7B

METHOD AND APPARATUS OF REMOTE MANAGEMENT OF COMPUTER SYSTEM USING VOICE AND GESTURE BASED INPUT

FIELD

The present disclosure generally relates to remote management control of a host computer system, and more particularly to remote management of host computer system using voice and gesture based input on a remote computing device.

BACKGROUND

A user typically is required to stay close to a computer connected to a network in order to monitor and manage computer systems through baseboard management controllers (BMCs). It is, however, difficult for a user to monitor and maintain the computer systems when he is not in the office and has no access to a networked computer.

Remote computing devices such as Smartphones and tablets with network access become more and more common nowadays. Using remote computing devices gives users more flexibility and convenience, and increases productivity and quality of services. With advancement of technologies, a user is able to provide voice and gesture based inputs to remote computing devices. Therefore, using a remote computing device to manage computer systems through baseboard management controllers (BMCs) with voice and gesture input may become possible.

Therefore, unaddressed needs exist in the art to address the aforementioned deficiencies and inadequacies.

SUMMARY

Certain aspects of the present disclosure are directed to a management application of a computer system using voice and gesture based inputs. An application module is executed on a processor of a computing device. The application module is configured to: (a) display, on the computing device, a first user interface allowing a user to enter a first input, the first input including at least one of a voice input and a gesture input, (b) receive input data from the computing device representing the first input, the input data including at least one of audio input data and multitouch input data, (c) determine, based on the input data, a first command from a plurality of commands targeted to a baseboard management controller (BMC) managing a computer system, (d) construct a first message including the determined command, and (e) send the first message to the BMC over a network.

In certain embodiments, the commands include commands for managing at least one of the following management functions of the BMC: a KVM management function, a Virtual Media management function, a sensors management function, a Field Replaceable Unit (FRU) management function, an Event Log management function, and a configuration management function. In certain embodiments the commands also include commands for managing at least one of the following devices of the computer system: an IPM Device, a Sensor Device, a SDR Repository Device, a SEL Device, an FRU Inventory Device, an Event Receiver Device, an Event Generator Device, an Application Device, a PEF Device, an Alert Processing Device, and a Chassis Device.

In certain embodiments, the application module is configured to: (a) store a plurality of record entries mapped to the plurality of commands, respectively, (b) generate an input entry based on the input data, (c) compare the input entry to the plurality of record entries and select a first record entry of the plurality of record entries based on the comparison, and (d) obtain the first command that is mapped to the first record entry. In one embodiment, the input data are audio input data, and the plurality of record entries and the input entry each include a text string. The application module is configured to: (a) recognize, through voice recognition, a first text string from the audio input data and include the first text string in the input entry, and (b) match the first text string with the text strings included in the plurality of record entries. In another embodiment, the input data are audio input data, and the plurality of record entries and the input entry each define a set of audio characteristics. The application module is configured to determine a first set of audio characteristics from the input data and use the input entry to define the first set of audio characteristics.

In certain embodiments, the input data are multitouch input data, and the plurality of record entries and the input entry each define a gesture. The application module is configured to: (a) recognize, through gesture recognition, a first gesture from the multitouch input data and use the input entry to define the first gesture, and (b) match the first gesture with the gestures defined in the plurality of record entries. In one embodiment, the input data are multitouch input data, and the plurality of record entries and the input entry each define a set of multitouch characteristics. The application module is configured to: (a) determine a first set of multitouch characteristics from the input data and use the input entry to define the first set of multitouch characteristics, and (b) compare the first set of multitouch characteristics with the sets of multitouch characteristics defined in the plurality of record entries.

In certain embodiments, the application module is configured to generate the first user interface, and the first user interface shows options that allow a user to select at least one of a voice input and a gesture input to manage the BMC. In certain embodiments, the application module is configured to: (a) encapsulate the first message in at least one first network packet, (b) determine a network address of the BMC, and (c) transmit the at least one first network packet to the network address through the network. In certain embodiments, the first message is an IPMI message, and the application module is configured to: (a) receive at least one second network packet encapsulating an IPMI response message, (b) extract the IPMI response message from the second network packets, (c) extract response data from the IPMI response message, and (d) display a second interface on the computing device, the second interface having the response data.

In certain embodiments, the management application also includes: (a) a management module, (b) an input module, (c) a user interface module, (d) a KVM module, (e) a virtual media module, (f) a message module, and (g) a communication module. The management module is configured to manage interactions between the management application and the BMC as well as between the management application and a user. The input module is configured to: (a) receive the audio input data from an audio input device of the computing device, and (b) receive the multitouch input data from a multitouch device of the computing device. The input module determines, based on the input data, the first command from the plurality of commands. The user interface module is configured to display, as instructed by the management module, user interfaces for interacting with the user, including the first user interface, on a display of the computing device. The KVM module is configured to receive, from the BMC, video output from the computer system redirected by the BMC. The virtual media module is configured to instruct the BMC to emulate a selected type of media to the computer system and to provide data to the computer system through the emulated media. The message module is configured to construct the first message, and the first message is an IPMI message. The communication module is configured to establish a communication channel between the management application and the BMC and to send the first message to the BMC. The communication module communicates with the BMC through a TCP/IP socket or a UDP/IP socket.

Certain aspects of the present disclosure are directed to a method of remote management of computer system using voice and gesture based inputs. The method includes: (a) generating a first user interface of a management application to show options to a user to select at least one of a voice input and a gesture input to manage a baseboard management controller (BMC), (b) displaying on a computing device the first user interface allowing a user to enter a first input, the first input including at least one of a voice input and a gesture input, (c) receiving input data from the computing device representing the first input, the input data including at least one of audio input data and multitouch input data, (d) determining, based on the input data, a first command from a plurality of commands targeted to a BMC managing a computer system, (e) constructing a first message including the determined command, and (f) sending the first message to the BMC over a network. The plurality of commands include commands for managing at least one of the following management functions of the BMC: a KVM management function, a Virtual Media management function, a sensors management function, a Field Replaceable Unit (FRU) management function, an Event Log management function, and a configuration management function. The commands include commands for managing at least one of the following devices of the computer system: an IPM Device, a Sensor Device, a SDR Repository Device, a SEL Device, an FRU Inventory Device, an Event Receiver Device, an Event Generator Device, an Application Device, a PEF Device, an Alert Processing Device, and a Chassis Device.

In certain embodiments, the input data are audio input data, and the record entries and the input entry each include a text string. The method includes: (a) storing text record entries mapped to the commands, respectively, (b) recognizing, through voice recognition, a first text string from the audio input data and include the first text string in the text input entry, (c) matching the first text string with the text strings included in the text record entries, (d) generating a text input entry based on the audio input data, (e) comparing the text input entry to the text record entries and selecting a first text record entry of the plurality of text record entries based on the comparison, and (f) obtaining the first command that is mapped to the first text record entry.

In certain embodiments, the input data are multitouch input data, and the record entries and the input entry each define a gesture. The method includes: (a) determining a first set of multitouch characteristics from the multitouch input data and using a multitouch input entry to define the first set of multitouch characteristics, (b) comparing the first set of multitouch characteristics with the sets of multitouch characteristics defined in the plurality of multitouch record entries, (c) recognizing, through gesture recognition, a first gesture from the multitouch input data and using the multitouch input entry to define the first gesture, and (d) matching the first gesture with the gestures defined in the plurality of multitouch record entries.

In certain embodiments, the method includes: (a) encapsulating the first message in at least one first network packet, the first message being an IPMI message, (b) determine a network address of the BMC, (c) transmitting the at least one first network packet to the network address through the network, (d) receiving at least one second network packet encapsulating an IPMI response message, (e) extracting the IPMI response message from the second network packets, (f) extracting response data from the IPMI response message, and (g) displaying the response data on a second interface on the computing device.

In certain embodiments, the method includes: (a) at a management module, managing interactions between the management application and the BMC as well as between the management application and a user; (b) at an input module, receiving the audio input data from an audio input device of the computing device, receiving the multitouch input data from a multitouch device of the computing device, determining, based on the input data, the first command from the plurality of commands; (c) at a user interface module, displaying, as instructed by the management module, user interfaces for interacting with the user, including the first user interface, on a display of the computing device; (d) at a KVM module, receiving, from the BMC, video output from the computer system redirected by the BMC; (e) at a virtual media module, instructing the BMC to emulate a selected type of media to the computer system and to provide data to the computer system through the emulated media; (f) at a message module, constructing a first IPMI message; and (g) at a communication module, establishing a communication channel between the management application and the BMC and to send the first IPMI message to the BMC. The communication module communicates with the BMC through a TCP/IP socket or a UDP/IP socket.

Certain aspects of the present disclosure are directed to a non-transitory computer storage medium. The non-transitory computer storage medium stores computer-executable instructions. These computer-executable instructions, when executed by a processor of a computing device, cause the processor to: (a) generate a first user interface showing options that allow a user to select at least one of a voice input and a gesture input to manage a baseboard management controller (BMC), (b) display the first user interface on the computing device for the user to enter a first input, the first input including at least one of a voice input and a gesture input, (c) receive input data from the computing device representing the first input, the input data including at least one of audio input data and multitouch input data, (d) determine, based on the input data, a first command from commands targeted to a BMC managing a computer system, (e) construct a first message including the determined command, and (f) send the first message to the BMC over a network.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The accompanying drawings illustrate one or more embodiments of the disclosure and, together with the written description, serve to explain the principles of the disclosure. Wherever possible, the same reference numbers are used throughout the drawings to refer to the same or like elements of an embodiment, and wherein:

FIG. 7B illustrates an exemplary detail display interface according to one embodiment of the present disclosure;

DETAILED DESCRIPTION

Figure 1A:
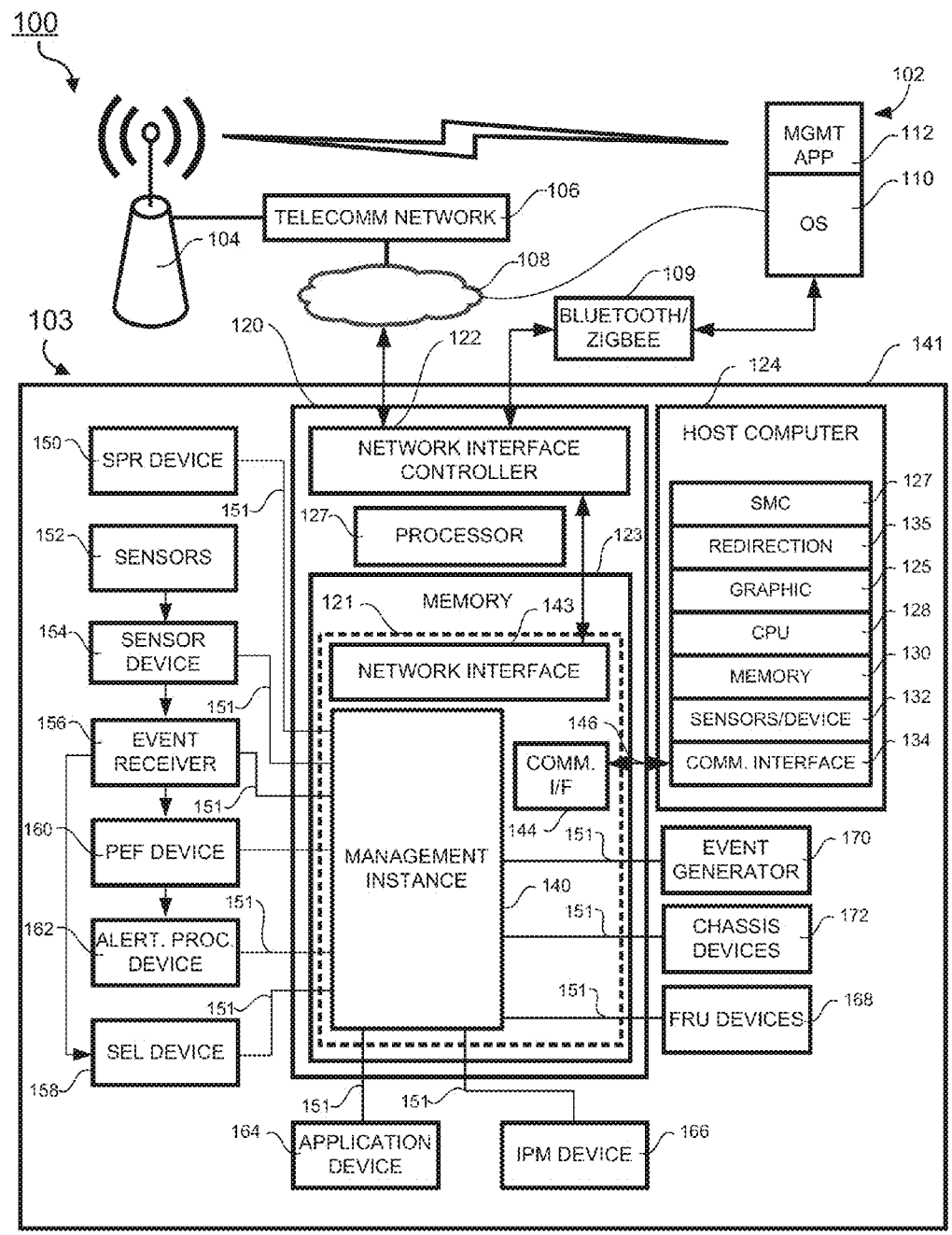
FIG. 1A is a conceptual illustration of a computer management system using a remote device with voice and gesture based input according to one embodiment of the present disclosure.

The present disclosure is more particularly described in the following examples that are intended as illustrative only since numerous modifications and variations therein will be apparent to those skilled in the art. Various embodiments of the disclosure are now described in detail. Referring to the drawings, like numbers, if any, indicate like components throughout the views. As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise. Moreover, titles or subtitles may be used in the specification for the convenience of a reader, which shall have no influence on the scope of the present disclosure. Additionally, some terms used in this specification are more specifically defined below.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, "plurality" means two or more.

As used herein, the terms "comprising," "including," "carrying," "having," "containing," "involving," and the like are to be understood to be open-ended, i.e., to mean including but not limited to.

As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The present disclosure will now be described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art. Like numbers refer to like elements throughout.

Referring to FIG. 1A, a conceptual illustration of a networked management computer system 103 is shown according to one embodiment of the present disclosure. The networked management computer system 103 includes, a remote device 102, a managed computer system 103 including a management device 120, and managed host computer 124. In certain embodiments, the management device 120 can be a Baseboard Management Controller (BMC), and the host computer can be computer boards or blade servers plugged onto a back plane in a chassis 141. The management device 120 communicatively connected to the managed host computer 124. The management device 120 may be a general purpose computer system. It should be appreciated that the management device 120 may alternatively be a "special purpose" computer system or a system that incorporates more than one interconnected system, such as a client-server network. Indeed, the management device 120 of FIG. 1A only represents an exemplary embodiment of the present disclosure, and therefore, should not be considered to limit the disclosure in any manner. A BMC will now be used in the description as an example of the management device 120. One skilled in the art would appreciate that other similar devices can be used in place of the BMC 120. The BMC 120 includes a processor 127, firmware 121 stored in a memory 123, and a network interface controller 122.

Intelligent Platform Management Interface ("IPMI") is an industry standard for system monitoring and event recovery. The IPMI specification provides a common message-based interface for accessing all of the manageable features in a compatible computer. IPMI includes a rich set of predefined commands for reading temperature, voltage, fan speed, chassis intrusion, and other parameters. System event logs, hardware watchdogs, and power control can also be accessed through IPMI. In this manner, IPMI defines protocols for accessing the various parameters collected by a BMC 120 through an operating system or through an external connection, such as through a network or serial connection. Additional details regarding IPMI can be found in the IPMI Specification (Version 2.0), which is publicly available from INTEL CORPORATION, and which is incorporated herein by reference.

IPMI uses message-based interfaces for the different interfaces to the platform management subsystem such as IPMB, serial/modem, LAN, ICMB, PCI Management Bus, and the system software-side "System Interface" to the BMC 120.

All IPMI messages share the same fields in the message 'payload'—regardless of the interface (transport) that they're transferred over. The same core of IPMI messages is available over every IPMI-specified interface, they are just 'wrapped' differently according to the needs of the particular transport. This enables a piece of management software that works on one interface to be converted to use a different interface mainly by changing the underlying 'driver' for the particular transport.

IPMI messaging uses a request/response protocol. IPMI request messages are commonly referred to as commands. The use of a request/response protocol facilitates the transfer of IPMI messages over different transports. It also facilitates multi-master operation on busses like the IPMB and ICMB, allowing messages to be interleaved and multiple management controllers to directly intercommunicate on the bus.

IPMI commands are grouped into functional command sets, using a field called the Network Function Code. There are command sets for sensor and event related commands, chassis commands, etc. This functional grouping makes it easier to organize and manage the assignment and allocation of command values.

All IPMI request messages have a Network Function, command, and optional data fields. All IPMI response messages carry Network Function, command, optional data, and a completion code field. As inferred earlier, the difference between the different interfaces has to do with the framing and protocols used to transfer this payload. For example, the IPMB protocol adds fields for $I^2C$ and controller addressing, and data integrity checking and handling, whereas the LAN interface adds formatting for sending IPMI messages as LAN packets.

In one embodiment, the remote device 102 includes a management application 112 running on an operating system 110. In certain embodiments, the remote device 102 is in communication with a wireless base station 104, which is connected with a telecommunication network 106. The telecommunication network 106, through another computer network 108 such as LAN/WAN/Internet/WI-FI, is in communication with the managed computer system 103. In certain embodiments, the remote device 102 is directly connected with the computer network 108. In certain embodiments, the remote device 102 is connected with the managed computer system 103 through Bluetooth or Zigbee. Thus, the management application 112 on the remote device 102 can construct an IPMI or BMC message and send the message to the managed computer system 103 through the telecommunication network 106 and the computer network 108 in order to perform a management action or operation on the managed computer system 103. The IPMI message may include, among other things: (1) the source IP/MAC address, (2) a session ID, (3) a sequence number, (4) a Responder's Address, (5) the Responder's Logic Unit Number (LUN), (6) a Requester's Address, (7) the Requester's LUN, (8) command CMD, and (9) a message Channel number. In certain embodiments, the IPMI message may also include encapsulated data for IPMB request. The encapsulated data for IPMB request may include: (1) the Responder's Address, (2) the Responder's LUN, (3) the Requester's Address, (4) the Requester's LUN, (5) the command CMD, e.g., Get Sensor Reading, and (6) the sensor number.

The management device 120 includes a network interface controller 122 that is in communication with the computer network 108. The management device 120 also includes a processor 127 and a memory 123 having firmware 121 stored on it. When the firmware 121 is executed by the processor 127, the firmware 121 can initiate a management instance 140, such as an IPMI software stack or BMC software stack that performs management functions of the computer system 103. The firmware includes a network interface 143, through which the management instance can be in communication with the network interface controller 122. The firmware 121 includes one or more communication interfaces 144 that can be utilized by the management instance 140 to send IPMI or BMC messages to, and receive IPMI or BMC messages from, the managed host computer through different communication channels. The communication interface 144 can include any system interface defined by the IPMI, i.e., keyboard controller style ("KCS") interface, a system management interface chip ("SMIC") interface, a block transfer ("BT") interface, and SMBus System Interface (SSIF). The communication interface 144 can also include a USB interface, a network interface, such as an IPMI LAN interface, and a serial/modem interface.

In certain embodiments, the managed host computer 124 has one or more communication interface 134 that corresponds to the communication interfaces 144 of the BMC 120. A corresponding communication channel 146 is established between the corresponding communication interfaces 144 of the BMC 120 and the communication interface 134 of the managed host computer 124. Therefore, the BMC 120 and the managed host computer 124 can communicate with each other through the communication channel 146. For example, both the BMC 120 and the managed host computer 124 each can have a system management bus interface 144 and 134 and communicate with each other through a system management bus 146 connecting the system management bus interfaces 144 and 134.

In general, the management instance 140 monitors operation, performance, and health-related aspects associated with the managed host computer 124, such as the temperature of one or more components of the managed host computer 124, speed of rotational components (e.g., spindle motor, CPU Fan, etc.) within the system, the voltage across or applied to one or more components within the managed host computer 124, and the available or used capacity of memory devices within the managed host computer 124. The management instance 140 is communicatively connected to the one or more management devices such as IPM Device 166, Sensor Device 154, SDR Repository Device 150, SEL Device 158, FRU Inventory Device 168, Event Receiver Device 156, Event Generator Device 170, Application Device 164, PEF Device 160, Alert Processing Device 162, and Chassis Device 172 defined by IPMI. Each of the above devices can communicate with the management instance 140 through an established communication channel 151 such as a system management bus. In one embodiment, these components include sensor devices 132 for measuring various operating and performance-related parameters within the managed host computer 124. A sensor 152 and the sensor devices 154 may be either hardware or software based components configured or programmed to measure or detect one or more of the various operating and performance-related parameters. The management instance 140 may receive this information sensed by the sensors 152, and 154 via a communication bus for analysis, and more particularly, for determination as to whether an "event" is occurring within the managed computer system 103. For example, like many electrical components, the CPU 128 dissipates heat while operating. As such, a CPU fan (not shown in FIG. 1A) can be used to cool off the CPU 128 after the CPU 128 reaches a prescribed temperature. Such a determination, i.e., whether the CPU 128 exceeds a prescribed temperature, can be made by the management instance 140.

In certain embodiments, the management instance 140 and the managed host computer 124 each can have an IPMB interface 134, 144 connected to an IPMB bus 146 and communicate with each other through the IPMB bus 146. The managed host computer 124 may have one or more managed devices 132. The management instance 140 can communicate with the managed devices 132 through the IPMB bus 146. Further, a managed host computer 124 may also have a satellite management controller 127. The management instance 140 can communicate with the satellite management controller through the IPMB bus.

In general, the BMC 120 is a microcontroller that monitors operation of the management computer system 103. In a more specific embodiment, the BMC 120 monitors health-related aspects associated with the management computer system 103, such as, but not limited to, the temperature of one or more components of the management computer system 103, speed of rotational components (e.g., spindle motor, CPU Fan, etc.) within the system, the voltage across or applied to one or more components within the system 100, and the available or used capacity of memory devices within the system 100. To accomplish these monitoring functions, the BMC 120 is communicatively connected to one or more components by way of a system interface such as the management bus. In an embodiment, these components include sensor devices for measuring various operating and performance-related parameters within the management computer system 103. The sensor devices may be either hardware or software based components configured or programmed to measure or detect one or more of the various operating and performance-related parameters.

Figure 1B:
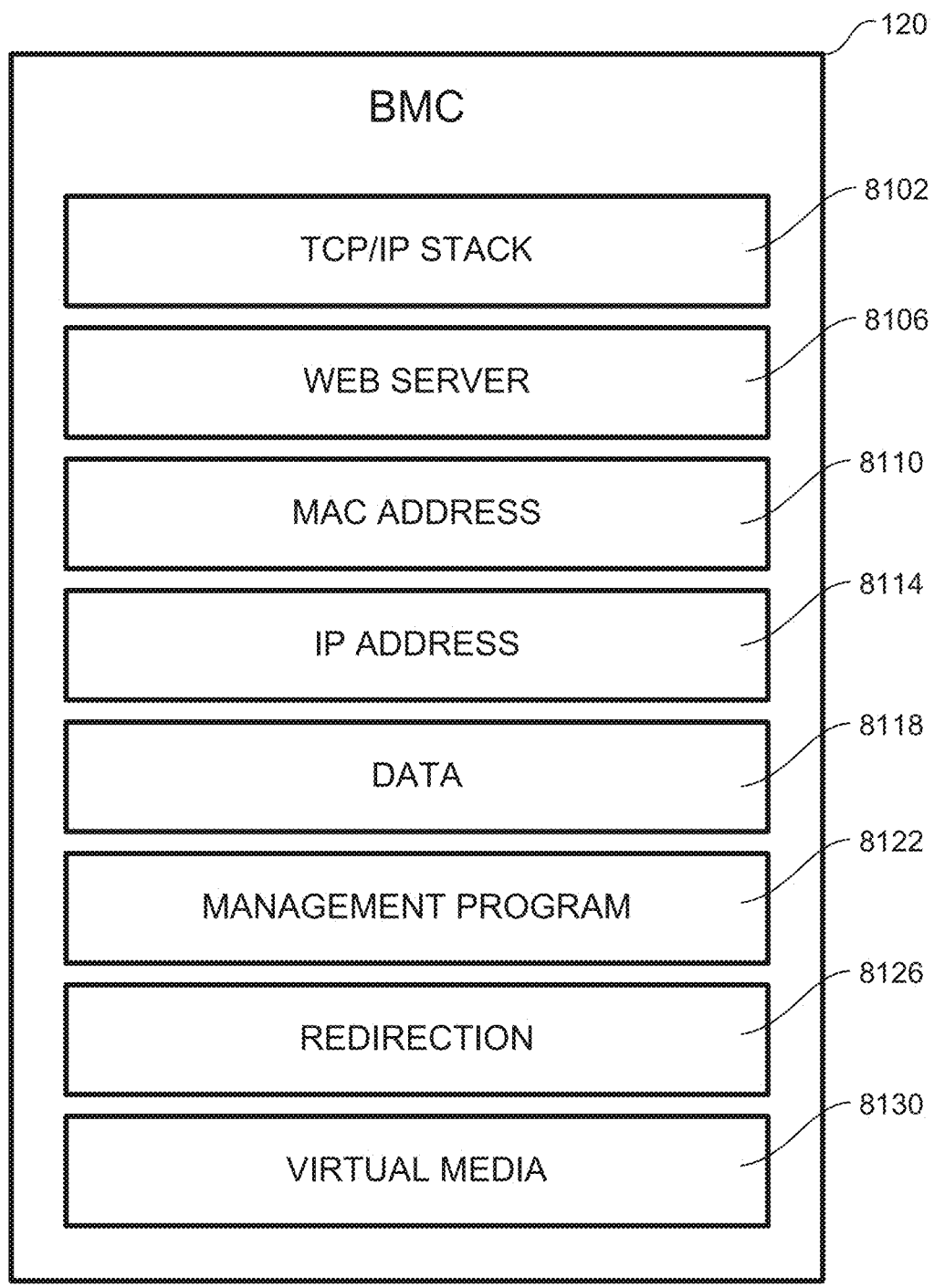
FIG. 1B is an illustration of a BMC of a computer management system according to one embodiment of the present disclosure.

FIG. 1B illustrates an exemplary configuration of a BMC in accordance with certain embodiments of the present disclosure. The BMC 120 includes a TCP/IP stack 8102, a web server application program 8106, and the MAC address 8110 that identifies the BMC 120 as the destination of network packets addressed to the MAC address 211. Thus, by executing the web server application program 8106 and the TCP/IP stack 8102, and programming the network interface controller 122 (as shown in FIG. 1A) to forward network packets addressed to the MAC address 211, the BMC 120 can receive and respond to requests for management information via a web interface. This implementation enables direct communication from the remote computing device 102 to the BMC 120. Further, because the BMC 120 has been allocated a MAC address, an IP address 8114 may also be allocated to the BMC 120. The IP address 8114 identifies the BMC 120 on the TCP/IP network so that network packets may be routed to and from the BMC 120 the IP address 8114. The IP address 8114 may also be allocated a domain name that may be utilized in a URL to identify one or more web pages available from the web server application program 8106.

The BMC 120 also includes a management program 8122 representing the BMC 120 firmware that can configure or program the network interface controller 122 to pass network packets addressed to the MAC address 211 and received over the network 108 to the BMC 120. The management program 8122 also monitors, analyzes, and communicates measured operating and performance-related parameters within the management computer system 103, as sensed via the sensors 132, 154. The sensors 132, 154 measure or sense operating and performance-related parameters associated with the management computer system 103 and provide this information to the BMC 120 via the communication channel 151, 146 for analysis, and more particularly, for determination on whether an "event" is occurring within the management computer system 103.

In one embodiment, the host computer 124 also has a redirection module 135, a graphic adapter 125, a CPU 128, a memory 130, and sensor devices 132. The redirection module 135 allows a user to control the keyboard and mouse functions of the managed host computer 124 from the remote computing device 102 over the network 108. The redirection module 135 may also be utilized to provide the video display shown on the managed host computer 124 to the remote computing device 102. In particular, in accordance with illustrative embodiments of the present disclosure, the redirection module 135 communicates compressed video data generated on the managed host computer 124 to the remote computing device 102. To accomplish the above-noted and other functions, the redirection module 135 is communicatively connected to one or more components either directly or by way of a management bus. In particular, the redirection module 135 is connected to a video out port of the graphics adapter 125, as well as a keyboard input port and a mouse input port of the input/output module. It will be appreciated that the keyboard port and mouse port may include universal serial bus ("USB")

ports and/or PS/2 ports. It should be appreciated that the redirection module 135 may receive keyboard and mouse commands from the remote computing device 102 via the network 108. When received, the redirection module 135 is operative to pass the commands through to the input/output controller 110 so that the commands appear to the managed host computer 124 to have been made utilizing local keyboard and mouse devices.

The network interface controller 122 is communicatively connected to the management bus. The management bus is used by the redirection module 135 to communicate compressed video data to the remote computing device 102 over the network interface controller 122. Like the system bus 146, the component that initiates communication on a bus is referred to a master and the component to which the communication is sent is referred to a slave. As such, the redirection module 135 functions as the master on the management bus in most circumstances, but may also function as a slave in other circumstances. Each of the various components communicatively connected to the redirection module 135 by way of the management bus is addressed using a slave address. In one embodiment, the management bus may be an I²C® bus, which is manufactured by Phillips Semiconductors® and described in detail in the I²C® bus Specification, version 2.1 (January 2000). The redirection module 135 also includes compression program code which may be an executable program module containing program code for filtering and compressing video data for communication over the network 108 to the remote computing device 102. It should be appreciated that the redirection module 135 may be configured with its own network adapter for communicating with the remote computing device 102 directly over the network 108.

The graphics adapter 125 can also be utilized to display of video data (i.e., text and/or graphics) on a display unit. It will be appreciated that the video graphics adapter may process analog signals (i.e., VGA) or digital signals (i.e., DVI) for display on a compatible display unit. The video graphics adapter 125 includes a video buffer for temporarily storing one or more lines of video data to be displayed on the display unit.

In accordance with an illustrative embodiment of the present disclosure, the components of the redirection module 135 may be incorporated into a firmware card, such as a PCI card, which is "plugged-in" to the motherboard of the managed host computer 124. These components may include a field-programmable gate array ("FPGA"). The FPGA communicates with the BMC 120 over parallel bus 146. The BMC 120 can have a redirection program 8126 that instructs the FPGA to capture screens of video data and compress changed video data from the video graphics adapter 125 in accordance with program instructions contained in the compression program code. In certain embodiments, once the changed video data has been compressed, the FPGA generates and sends an interrupt signal to the BMC 120. The BMC 120 then sends the compressed video data to the remote computing device 102 via the network interface controller 122. It will be appreciated that the FPGA and the BMC 120 may be application specific circuits ("ASICs") designed for performing the aforementioned tasks. ASICs are well known to those skilled in the art. Those skilled in the art will further appreciate that the redirection module 135 may also be incorporated as an external hardware device. The external device may include a video port for connection to a video graphics adapter, keyboard and mouse ports, and a network port (e.g., a network interface card) for connection to a computer network.

Further, the BMC 120 may also have a virtual media program 8130 that provides for additional management with the remote computing device 102 by providing a USB connection 146 to a USB port 134 of the managed host computer 124. The USB connection 146 allows the BMC to emulate USB devices for the managed host computer 124, such as additional mass storage devices including devices that the managed host computer 124 may use when booting-up. For example, the remote computing device 102 may provide a floppy, CD-ROM, DVD, SD, ISO image, or hard disk drive. Those media can contain a boot-up sequence to be used by the managed host computer 124. Upon a connection being established over the network 108 between the BMC 120 and the remote computing device 102, the managed host computer 124 may boot from a media source of the remote computing device 102 with the boot-up sequence provided through the USB port 134.

The BMC may emulate a mass storage device, such as the emulated CD-ROM device, on a USB connection 146. The emulated CD-ROM device may be utilized to redirect the contents of a mass storage device attached to the remote computing device 102 to the managed host computer 124. The emulated CD-ROM device may also be utilized for providing out-of-band communication between the managed host computer 124 and the BMC 120. The emulated CD-ROM device appears to the managed host computer 124 as a standard USB CD-ROM. Accordingly, the operating system executing on the managed host computer utilizes a standard CD-ROM driver provided by the manufacturer of the operating system utilized on the managed host computer 124 for communicating with the CD-ROM device. Custom hardware drivers may be unnecessary.

Figure 1C:
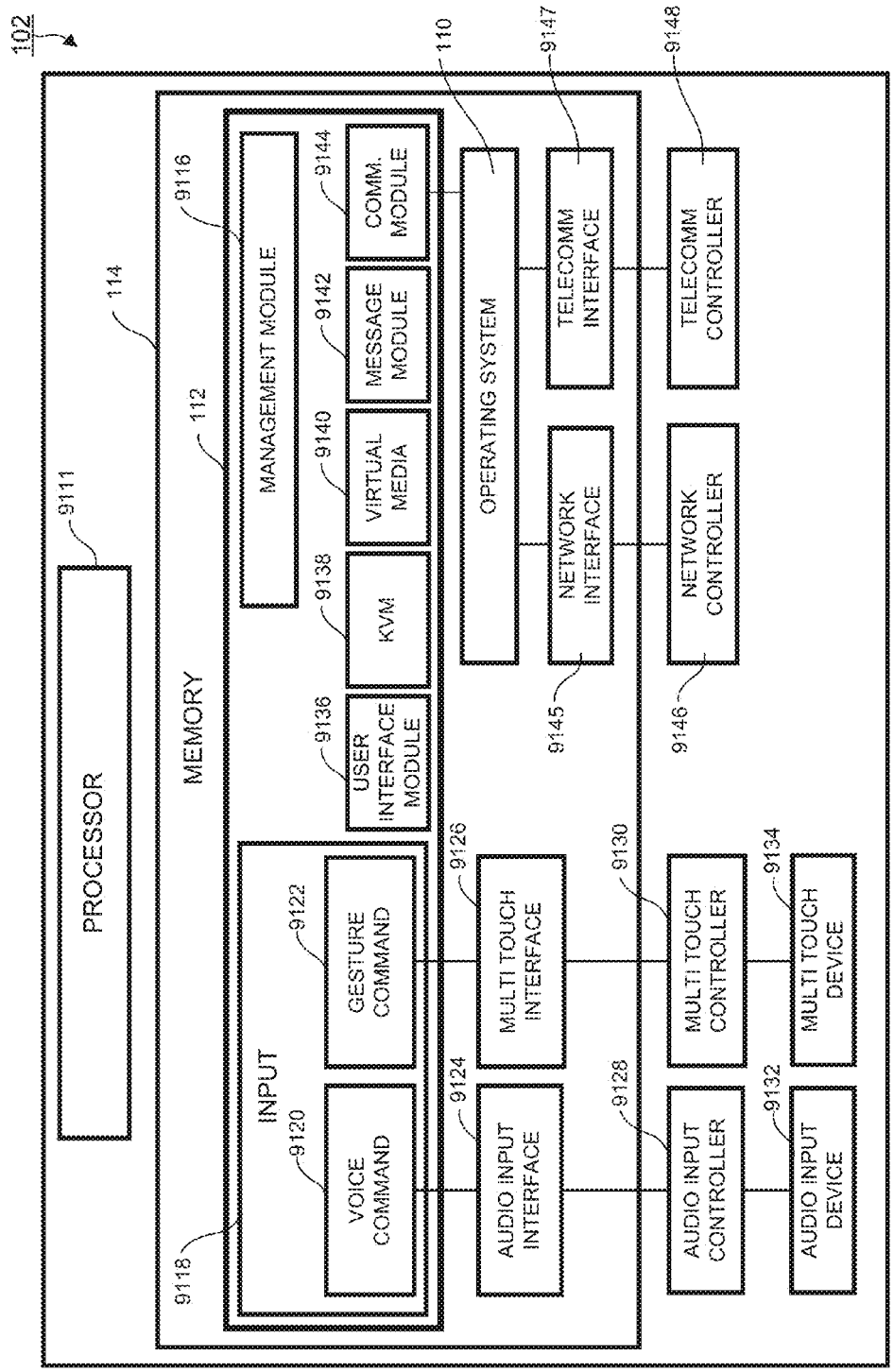
FIG. 1C is an illustration of a remote computing device of a computer management system according to one embodiment of the present disclosure.

FIG. 1C illustrates a remote computing device 102 in accordance with certain embodiments of the present disclosure. The remote computing device 102 can be a Smartphone such as an iPhone or an Android Smartphone, or a tablet computing device such as an iPad or any Android tablet device that has network connectivity, such as telecommunication, LAN/WAN/Internet, Bluetooth, ZigBee or Wi-Fi connectivity. In certain embodiments, the remote computing device 102 includes a processor 9111, a memory 114 having an operating system 110, an audio input interface 9124, and a multitouch input interface 9126, a network interface 9145, and a telecommunication interface 9147. In certain embodiments, the remote computing device 102 can also include an audio input device 9132 such as a microphone, and audio input controller 9128, a multitouch input device 9134 such as a touch screen, and a multitouch controller 9130. A management application 112 is installed on the remote computing device 102. The management application 112 can include a management module 9116, a user interface module 9136, and input module 9118 having a voice command sub-module 9120 and a gesture command sub-module 9122, a KVM module 9138, a virtual media module 9140, a message module 9142, and a communication module 9144.

As stated, the audio input device 9132 can be a microphone that converts voice input to analog or digital signals. The audio input controller 9128 controls the operation of the audio input device 9132 and receives the signals from the audio input device 9132. The audio input controller 9128 converts the audio input signals into audio data representing the audio input signals. The management application 112 and operating system 110 can utilize the audio input interface 9124 to communicate with audio input controller 9128 and, among other things, retrieve the audio data from the audio input controller. More specifically, in certain embodiments, the input module of the management application communicates with the audio input interface and then retrieves the audio input data. The input module 9118 has a voice command sub-module 9120, which can analyze the audio input data and determine corresponding commands based on the audio input data. For example, the voice command sub-module 9120 can have a voice recognition function that analyzes the audio input data and converts them into texts such as letters "A", "B", . . . , and "Z"; digits such as 0, 1, . . . , and 9, and a dot "."; words such as "Menu", "logout", . . . , and "back," etc.; and phrases such as "previous page", "next page", . . . , and "server 175," etc. In certain circumstances, the voice recognition accuracy decreases when the number of target characters, words, and phrases increases. Therefore, it will be beneficial to limit the size of the recognizable vocabulary. In one embodiment, in order to reduce accidental activation of the voice input, human voice may be recognized only if a user presses a microphone icon on the screen. In one embodiment, each of the audio input devices 9132, the audio input controller 9128, and the audio input interface 9124 can be a part of the remote computing device 102 and can be utilized by relevant APIs of the remote computing device operating system 110.

As stated, the multitouch device 9134 can be a touch screen that can detect multiple touch points simultaneously applied to the screen and convert those detections to analog or digital signals. The multitouch controller 9130 controls the function of the multitouch device 9134 and receives the signals generated by the multitouch device 9134. The multitouch controller 9130 can convert the multitouch signals to multitouch data representing the multitouch signals. The management application and the operating system can utilize the multitouch input interface 9126 to communicate with the multitouch input controller 9130 and, among other things, retrieve the multitouch data from the multitouch input controller. More specifically, in certain embodiments, the input module of the management application communicates with the multitouch input interface and then retrieves the multitouch input data. The input module 9118 has a gesture command sub-module, which can analyze the multitouch input data and determine corresponding gestures based on the multitouch input data. For example, the gesture command sub-module can determine whether the multitouch input data represent gestures resembling texts (such as "A", "B", . . . , and "Z"), a single touch, a move to left or right, a move to up or down, a two finger pinch (moving two fingers towards each other), or a two finger separation (moving two fingers away from each other). In certain embodiments, the gesture command sub-module 9122 generates indications of gestures or gesture commands in accordance with the multitouch data and then sends the indications of gestures to the management module. The management module 9116, in turn, can interpret those gestures as commands of, e.g., selecting of the menu item, moving the screen to the left or right, moving the screen to up or down, zooming out a displayed item, zooming in a displayed item. In certain embodiments, each of the multitouch device 9134, multitouch controller 9130, and the multitouch interface 9126 can be a part of the remote computing device 102 and can be utilized by calling a number of APIs from the remote computing device 102's operating system 110.

In certain embodiments, the input module 9118 stores one or more record entries mapped to the one or more commands for managing the BMC 120, respectively. For example, a first record entry can contain a letter "K," which is mapped to a "KVM" command directed to the BMC 120. The second record entry can contain a letter "S," which is mapped into a Get Sensor Reading command.

In case of voice command processing, in certain embodiments, the voice command sub-module 9120 of the input module 9118 can use voice recognition to generate an input entry from the audio input data. For example, a letter "K" may be recognized from the audio input data. Then, the voice command sub-module 9120 can compare the input entry to the record entries, and select a first record entry have the letter "K" based on the comparison. Then the voice command sub-module 9120 can accordingly decide and obtain the KVM command directed to the BMC, and send that command to the management module 9116. The management module 9116, in turn, determines an appropriate BMC or IPMI message for this KVM command, and instructs the message module 9142 to construct such a BMC or IPMI message. The constructed BMC or IPMI message is then transmitted to the BMC 120 through the communication module 9144.

In certain embodiments, the voice command sub-module 9120 does not necessarily use voice recognition to determine a voice command from the audio input data. The voice command sub-module can determine values of a predetermined set of audio characteristics, such as frequency, amplitude, and duration of voice, of the audio input data. Accordingly, each of the record entries defines a set of values for the set of audio characteristics. The voice command sub-module can compare the values of the audio characteristics from the input with the values of the audio characteristics defined in the record entries, and then select a record entry and accordingly the mapped command.

In case of gesture command processing, in certain embodiments, the gesture command sub-module 9122 of the input module 9118 can use gesture recognition to generate an input entry from the multitouch input data. For example, a gesture resembling the letter "K" may be recognized from the multitouch input data. Then, the gesture command sub-module 9122 can compare the input entry to the record entries, and select a first record entry defining a gesture resembling the letter "K" based on the comparison. Then the gesture command sub-module can accordingly decide and obtain the KVM command directed to the BMC 120, and send that command to the management module 9116. The management module 9116, in turn, determines an appropriate BMC or IPMI message for this KVM command, and instructs the message module 9142 to construct such a BMC or IPMI message. The constructed BMC or IPMI message is then transmitted to the BMC 120 through the communication module 9144.

In certain embodiments, the gesture command sub-module 9122 can determine values of a predetermined set of multitouch characteristics, such as locations, trajectory, and duration of touch, of the multitouch input data. Accordingly, each of the record entries defines a set of values for the set of multitouch characteristics. The gesture command submodule can compare the values of the multitouch characteristics from the input with the values of the characteristics defined in the record entries, and then select a record entry and accordingly the mapped command.

In certain embodiments, the voice and the gesture command sub-modules 9120, 9122 will only interpret the input data as one of the entry included in the record entries. For example, in case of voice recognition, if the record entries only include letters of K, V, S, F, E, P, N, O, and U, then the audio input data are always recognized as one of the above letters. In case of gesture recognition, for example, if the record entries only include gestures resembling the letters of K, V, S, F, E, P, N, O, and U, then the multitouch input data are always recognized as one of the above gestures. To do so, the voice and the gesture command sub-modules can utilize fuzzy logic or other mechanisms.

In certain embodiments, the management module 9116 provides the overall functionalities of the management application 112 and is in communication with some or all of the other modules.

The user interface module 9136 is responsible for generating a graphic image such as a user interface and then display the image on a display device, such as a screen, of the remote computing device 102.

As illustrated above, the input module is responsible for receiving input data from one or more input devices connected with the remote computing device. The input module 9118 can analyze the input data and interpret the data as one or more user commands or inputs directed to the management application 112. For example, the inputs can be a string of text typed by the user, a selection of an item from a menu, a voice command, and a gesture command.

The KVM module 9138 is responsible for handling KVM related functions. As discussed above, the redirection module 135 of the host computer 124 receives the video output of from a managed host computer and transmits the video data to the BMC 120. The BMC 120 in turn can transmit the video data to the KVM module 9138 executing on the remote computing device 102 via the network 108. Typically, the video data is compressed, and the KVM module 9138 is operative to decompress the data stream and instruct the user interface module to display the video output of the managed host computer on the remote computing device 102. The displayed output may include screen displays generated by computer programs or the operating system on the managed host computer.

The KVM module 9138 can also receive user input commands, such as mouse or keyboard commands, generated at the remote computing device through the input module. The KVM module 9138 can instruct the communication module 9144 to transmit the commands to the redirection program 8126 at the BMC through the network. The redirection program 8126 of the BMC 120 can receive the user input commands from the KVM module 9138 and provide the input commands to the managed host computer 124 as if the input commands were locally generated by a user at the managed host computer 124. In order to provide this functionality, the redirection module may be physically and electrically connected to the input ports of the managed host computer (serial, USB, etc.).

The virtual media module 9140 is responsible handling virtual media related functions. As discussed above, the BMC can utilize an appropriate interface to accumulate a mass storage device. The BMC 120 is in communication with the virtual media module 9140 through the network and is able to send storage commands (such as read and write) and data to the virtual media module 9140. For example, the BMC 120 may emulate a CD-ROM to the managed host computer 124. When the managed host computer 124 issues a read command to the emulated CD-ROM, the BMC 120 will transfer that command to the virtual media module 9140 of the management application 112 at the remote computing device 102. The virtual media module 9140 can determine the requested data from the read command. The virtual media module 9140 then locates or obtains the requested data and transfers the data to the BMC through the communication module 9144 of the management application 112.

The message module 9142 is responsible for interpreting the IPMI or BMC messages received from the BMC 120 through the communication module 9144 and for constructing IPMI or BMC messages as instructed by the management module 9116.

The communication module 9144 is responsible for establishing a communication channel with the BMC 120. In certain embodiments, the remote computing device 102 includes a network controller 9146 that manages connections to computer networks and a telecommunication controller 9148 that manages connections to telecommunication networks. The communication module 9144 can access the network controller 9146 and the telecommunications controller 9148 through a network interface 9145 and a telecommunication interface 9147, respectively. In certain embodiments, the communication module 9144 of the management application 112 communicates with the network interface 9145 and the telecommunication interface 9147 through the operating system 110. In certain embodiments, the communication module 9144 can open a TCP/IP or UDP/IP socket and use that socket to establish a communication with the BMC and to receive video outputs from the BMC. In certain embodiments, the communication module 9144 can communicate with the web server application program 8106 of the BMC, and send messages to and receive messages from the web server application program 8106, using the HTTP protocol.

The remote computing device 102, through the communication links, is in communication with the BMC 120. Thus, the management application 112 on the remote computing device 102 can construct an IPMI or BMC message and send the message to the BMC through communication networks (such as the telecommunication network 106, computer networks 108 such as Wi-Fi/Internet/WAN/LAN, Bluetooth, and ZigBee) in order to perform a management action or operation on the managed host computer 124. The IPMI message may include, among other things: (1) the source IP/MAC address, (2) a session ID, (3) a sequence number, (4) a Responder's Address, (5) the Responder's Logic Unit Number (LUN), (6) a Requester's Address, (7) the Requester's LUN, (8) command CMD, and (9) a message Channel number. In certain embodiments, the IPMI message may also include encapsulated data for IPMB request. The encapsulated data for IPMB request may include: (1) the Responder's Address, (2) the Responder's LUN, (3) the Requester's Address, (4) the Requester's LUN, (5) the command CMD, e.g., Get Sensor Reading, and (6) the sensor number.

In certain embodiments, the management application 112 is an application program (APP) installed on the remote computing device 102 such as a smart phone. In this example, an icon is listed on the remote computing device 102. When a user wishes to use the management application 112, the user presses the icon of the APP and launches the application program.

Figure 2:
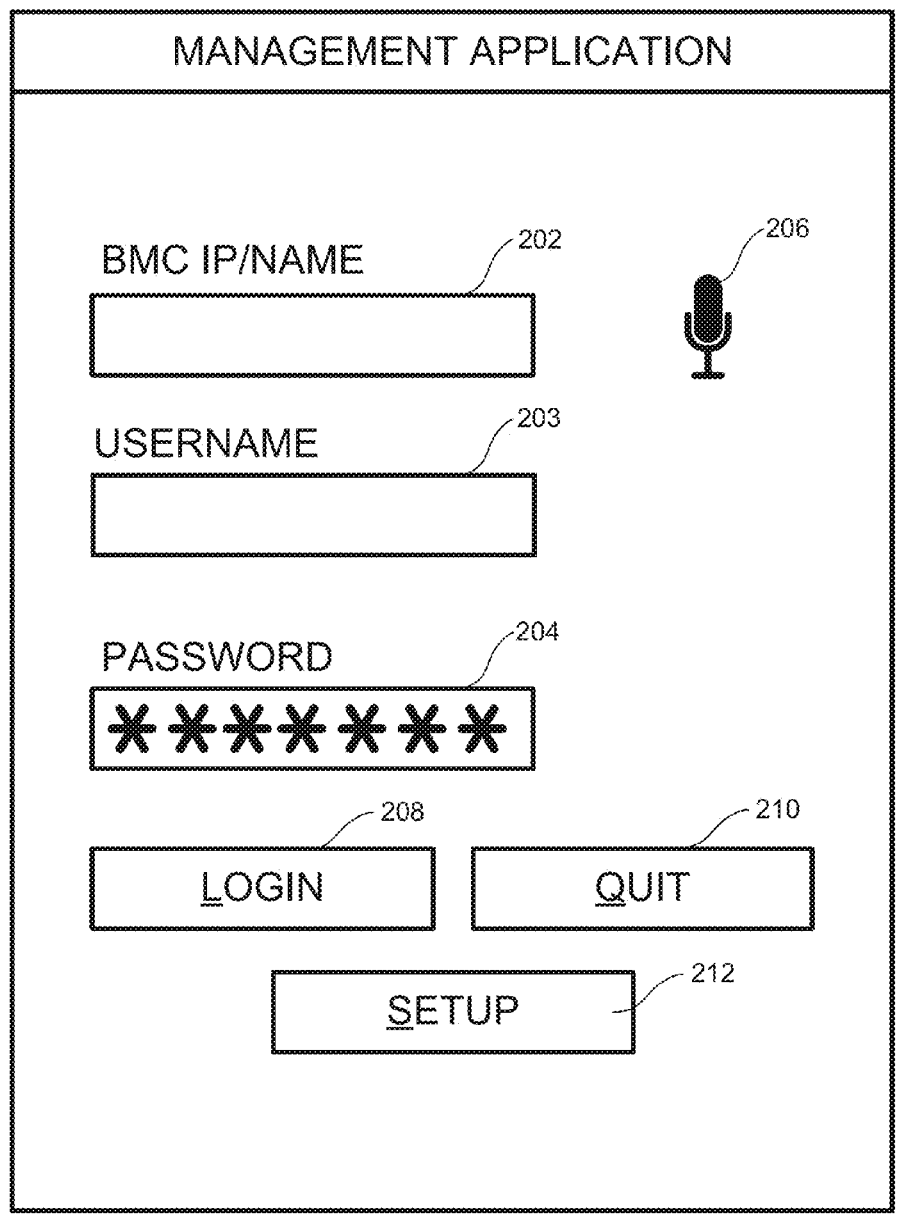
FIG. 2 illustrates an exemplary login user interface in accordance with certain embodiments of the present disclosure.

FIG. 2 illustrates an exemplary user interface 200 for logging into a computer management system 100 using a remote computing device 102 in accordance with certain embodiments of the present disclosure. The user interface 200 includes a BMC IP/Name field 202, a voice input option 206, a login option 208, a quit option 210, and a setup option 212. In certain embodiments, the management application 112 allows voice control. The login interface displays a voice input option 206, which a user can click if he or she desires to verbally enter information such as the BMC IP address or the BMC name. In this example, the user interface has a BMC IP/Name field 202 for the user to enter the BMC IP or host name of the BMC. In one embodiment, the user can press the voice input option 206 to enter the BMC IP/Name in field 202 verbally. The user can input the BMC IP address such as 10.0.0.1 by saying "ten, dot, zero, dot, zero, dot, 1." Alternatively, the user can say the host name of a BMC such as "server 75."

In certain embodiments, as discussed above, during operation the audio input device 9132 receives the audio input of the BMC IP address or hostname from the user and then converts the command to analog or digital signals. Those signals are transmitted to the audio input controller 9128, which in turn converts the signals into audio data. The voice command sub-module 9120 then obtains the audio data from the audio input controller 9128 through the audio input interface 9124. In certain embodiments, the voice command sub-module 9120 has knowledge of the command expected to receive from the user, for example, based on the type of user interface displayed on the screen. In this example, the voice command sub-module 9120 expects commands specifying the IP address or hostname of the BMC, as the login interface is currently displayed on the screen. Accordingly, a voice recognition program of the voice command sub-module 9120 is tuned to recognize IP addresses or any hostname that is known to the voice command sub-module 9120.

On the other hand, the user can also use gesture to provide the BMC IP/Name in field 202. The user can first touch the field 202 to indicate that the BMC IP/Name is about to be entered and then use a finger to make gestures on the touch screen of the remote computing device in order to provide the BMC IP/Name. For example, the following string of characters can be written by a user through his or her finger on the multitouch touch device 9134 in order to input the BMC IP address: "1, 0, 'dot', 0, 'dot', 0, 'dot', 1". Alternatively, the user can write "s, e, r, v, e, r, 'space', 7, 5" on the multitouch device 9134 to provide the host name of the BMC. The user can use one touch no movement on the touch screen to represent a "dot", and two touches with no movement on the touch screen to represent a "space". In another embodiment, an optional pull down menu may be added to the field 202 to allow the user to select a BMC IP or host name from a list that is setup prior to the login operation. The selected BMC is also referred as the designated BMC.

In certain embodiments, as discussed above, the multitouch input device receives the multitouch input of the BMC IP address or hostname from the user and the converts the command to analog or digital signals. Those signals are transmitted to the multitouch input controller, which in turn converts the signals into multitouch data. The multitouch data, for example, can indicate that multiple different locations of the touch screen are simultaneously touched or are touched in a predetermined time interval. The multitouch command sub-module 9122 then obtains the multitouch data from the multitouch input controller 9130 through the multitouch input interface 9126. In certain embodiments, the multitouch command sub-module 9122 has knowledge of the command expected to receive from the user for example based on the type of user interface displayed on the screen. In this example, the multitouch command sub-module 9122 expects commands specifying the IP address or hostname of the BMC, as the login interface is currently displayed on the screen. Accordingly, a gesture recognition program of the multitouch command sub-module 9122 is tuned to recognize IP addresses or any hostname that is known to the multitouch command sub-module 9122.

The login interface 200 also has an optional username field 203 and a password field 204 for the user to enter the password in order to access the BMC. The username and the password can be entered similarly by entering the BMC IP address or hostname described above. In one embodiment, for security reason, the voice input option 206 may not be used to enter password in the password field 204. The password can be entered by using a soft keyboard equipped with the remote computing device 102, or use gesture input option. The user can first touch the field 204 to indicate that the password is about to be entered. A soft keyboard appears on the screen (not shown here in FIG. 2), with an option to turn off the soft keyboard. If the user uses the soft keyboard, the typed letter will be display for a predetermined period of time to allow the user to ascertain correct input and then typed letter will turn into an asterisk, and move on to the next letter until the password is completely entered. On the other hand, if the user uses the gesture input option, then the soft keyboard may be turned off and one finger can be used to write the letter on the touch screen, preferably not in the area where the BMC IP/Name field 202, the password field 204, the Login option 208, the Quit option 210 and the Setup option 212 are located. In one embodiment, once the user touches the password field 204 to enter password, the voice input option 206 may be grayed out to indicate that the voice input option 206 is not available.

Once the requested information such as BMC IP/Name field 202, the user name, and the password field 204 have been entered to the login user interface 200, the user may click the "Login" option 208 to submit the information, thus requesting the management application 112 to establish a communication channel with the target BMC 120.

The BMC IP address and/or the BMC Name, the username, may be saved in the management application 112 for future use. By doing so, next time when the user launches the management application 112, the management module 9116 can retrieve the information such as the BMC network address and the user name from a data storage and pass the information to the user interface module 9136 to generate a login user interface 200. Therefore, the user interface 200 may provide the saved information as default input and the show it in the user interface 200. This provides convenience to the user and eliminates the need for manually inputting the same BMC network address and username by the user each time.

The login option 208 allows the user to submit the entered BMC information, username, and password to the management application. The management application 112 in turn uses the received information to establish a connection with the BMC. The user interface 112 also has a Quit option 210 which allows the user to exit the application, and a setup option 212 which the user can select to set up the voice and gesture commands for the management application 112.

In certain embodiments, the user can also use the voice input option 206 or the gesture input option to select "Login" option 208, the "Quit" option 210 and the "Setup" option 212. When the user presses the voice input option 206, the user can select: (a) the "Login" option 208 by saying the letter "L", or the word "login", (b) the "Quit" option 210 by saying the letter "Q", or the word "quit", and (c) the "Setup" option 212 by saying the letter "S", or the word "setup".

More specifically, after the voice command sub-module 9120 recognizes the IP address or the hostname, it sends the IP address or the hostname as well as the command type such as connection to the management module 9116.

Once the management module 9116 receives the BMC network address, the user name, and the password, the management module 9116 selects an appropriate IPMI or BMC message for making a connection with the target BMC 120. For example, in order to establish a session with the BMC 120, the management module 9116 can select a Get Session Challenge command and an Activate Session Command. The management module then can pass the username and password information to the message module and instructs the message module to construct a Get Session Challenge command and subsequently an Activate Session Command.

The message module 142, after receiving the indication of an IPMI or BMC message to be constructed and the data or parameters to be included in the IPMI or BMC message, will accordingly construct the IPMI or BMC message as instructed by the management module. An exemplary IPMI request includes one or more of: the source IP/MAC address, the Responder's Address, the Network function code, the Responder's LUN, the Requester's Address, the Requester's LUN, and the command. In certain embodiments, the IPMI or BMC message can also include a message Channel number for example indicating IPMB, encapsulated data for IPMB request. The encapsulated data for IPMB request includes one or more of: the Responder's slave address, the Responder's LUN, the Requester's slave address, the Requester's LUN, the command, e.g., Get Sensor Reading, and the Sensor Number. As an example, the message module 9142 constructs the requested IPMI or BMC message as a string of binary bits and then returns the string to the management module 9116.

The management module 9116, after receiving the constructed IPMI or BMC message from the message module, then sends the BMC's network address and the IPMI or BMC message to the communication module. The communication module 9144 encapsulates the IPMI or BMC message in one or more network packets addressed to the BMC's network address.

The communication module 9144, on the other hand, also receives network packets addressed to the management application 112 and transferred by the operating system 110 of the remote computing device 102. For example, after the BMC 120 receives the network packets encapsulating the Get Session Challenge command sent from the remote device 102, the BMC 120 will send an IPMI response, including for example challenge string data, back to the remote computing device 102. The communication module 9144 can extract the IPMI response from the network packets. Then, the communication module 9144 transfers the IPMI response, for example as a string of binary bits, to the management module 9116.

The management module 9116 after receiving the IPMI response will pass the response to the message module 9142. The message module 9142 can examine or parse the response, and then determines the type of the response and parameters/data contained in the response. For example, the message module 9142 can determine that the response is a response to the Get Session Challenge command and then extract the data field to retrieve the Challenge String Data. The message module 9142 then can call functions of the management module 9116 to pass information extracted and interpreted from the IPMI response.

In this example, the management module 9116 receives response of the session request information from the message module and then executes other operations in order to establish a connection with the target BMC. For example, the management module 9116 can send necessary information to the message module 9142 and instruct the message module 9142 to construct a selected session command. After receiving the session command from the message module 9142, the management module 9116 can transfer of the session command and the BMC address to the communication module 9144, and then request the communication module 9144 to encapsulate the session command in network packets addressed to the BMC 120 and send the packets to the network 108. Subsequently, the management module 9116 establishes a session over a communication channel (such as a LAN channel) with the management instance 140 of the BMC 120.

Figure 3:
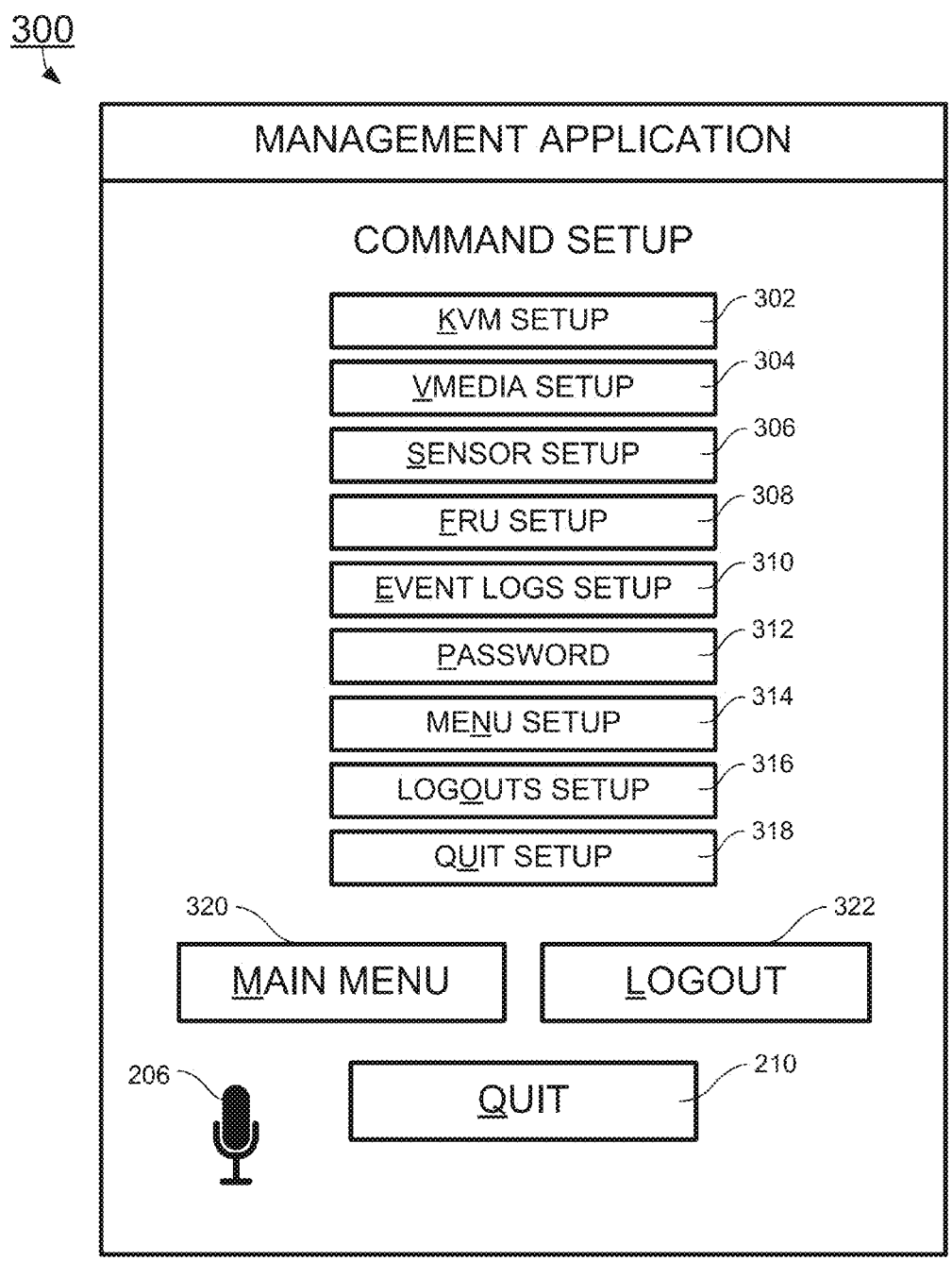
FIG. 3 illustrates an exemplary input command setup interface according to certain embodiments of the present disclosure.

Referring again to FIG. 2, when the user selects the Setup option 212 from the user interface 200, the management module 9116 can instruct the user interface module 9136 to display an input command setup interface. This option can be selected by the user through the voice input option 206 by saying the letter "S" as underlined in the setup option 212 or the word "setup", or through the gesture input option by writing the letter "S", or the word "setup" on the touch screen. FIG. 3 illustrates an exemplary input command Setup interface 300 according to certain embodiments of the present disclosure.

The input command set up interface 300 includes following configuration options:

(a) a KVM setup option 302 for the user to set up the voice command and the gesture command for selecting the KVM functions. For example, initially saying the letter "K" or the phrase "KVM setup", or writing the letter "K" or the word "KVM setup" can invoke this function. A user can use this option to change the voice command or gesture command. For example, after selecting this option, the user can speak a selected letter for example "X" or write a selected letter for example "X," which will be stored in the management application as the new voice command or the gesture command for selecting the KVM functions.

(b) a Virtual Media setup option 304 for the user to set up voice command and the gesture command for selecting the virtual media functions. For example, initially saying the letter "V" or the phrase "virtual media setup" or writing the letter "V" or the phrase "virtual media setup" on the touch screen can invoke this function. A user can use this option to change the voice command or gesture command. For example, after selecting this option, the user can speak a selected letter for example "X" or write a selected letter for example "X," which will be stored in the management application as the new voice command or the gesture command for selecting the virtual media function.

(c) a Sensor setup option 306 for the user to set up voice command and the gesture command for selecting the Sensor functions. For example, initially saying the letter "S" or the phrase "sensor setup" or writing the letter "S" or the phrase "sensor setup" on the touch screen can invoke these functions. A user can use this option to change the voice command or gesture command. For example, after selecting this option, the user can speak a selected letter for example "X" or write a selected letter for example "X," which will be stored in the management application as the new voice command or the gesture command for selecting the sensor functions.

(d) a FRU setup option 308 for the user to set up voice command and the gesture command for selecting the FRU functions. For example, initially saying the letter "F" or the phrase "FRU setup" or writing the letter "F" or the phrase "FRU setup" on the touch screen can invoke these functions. A user can use this option to change the voice command or gesture command. For example, after selecting this option, the user can speak a selected letter for example "X" or write a selected letter for example "X," which will be stored in the management application as the new voice command or the gesture command for selecting the FRU functions.

(e) an Event Logs setup option 310 for the user to set up voice command and the gesture command for selecting the FRU functions. For example, initially saying the letter "E" or the phrase "event logs setup", or writing the letter "E" or the phrase "event logs setup" on the touch screen can invoke this function. A user can use this option to change the voice command or gesture command. For example, after selecting this option, the user can speak a selected letter for example "X" or write a selected letter for example "X," which will be stored in the management application as the new voice command or the gesture command for selecting the Event Logs functions.

(f) a Password setup option 312 for the user to set up voice command and the gesture command for selecting the password functions. For example, initially saying the letter "P" or the phrase "password setup", or writing the letter "P" or the phrase "password setup" on the touch screen can invoke these functions. A user can use this option to change the voice command or gesture command. For example, after selecting this option, the user can speak a selected letter for example "X" or write a selected letter for example "X," which will be stored in the management application as the new voice command or the gesture command for selecting the Password functions.

(g) a Main Menu setup option 314 for the user to set up voice command and the gesture command for selecting the Main Menu functions. For example, initially saying the letter "N" or the phrase "Main Menu setup", or writing the letter "N" or the phrase "Main Menu setup" on the touch screen can invoke these functions. A user can use this option to change the voice command or gesture command. For example, after selecting this option, the user can speak a selected letter for example "X" or write a selected letter for example "X," which will be stored in the management application as the new voice command or the gesture command for selecting the Main Menu functions.

(h) a Logout setup option 316 for the user to set up voice command and the gesture command for logging out the current management session. For example, initially saying the letter "O" or the phrase "Logout setup", or writing the letter "O" or the phrase "Logout setup" on the touch screen can invoke this action. A user can use this option to change the voice command or gesture command. For example, after selecting this option, the user can speak a selected letter for example "X" or write a selected letter for example "X," which will be stored in the management application as the new voice command or the gesture command for logging out the current management session.

(i) a Quit setup option 318 for the user to set up voice command and the gesture command for quitting the management application. For example, initially saying the letter "U" or the phrase "Quit setup", or writing the letter "Q" or the phrase "Quit setup" on the touch screen can invoke this action. A user can use this option to change the voice command or gesture command. For example, after selecting this option, the user can speak a selected letter for example "X" or write a selected letter for example "X," which will be stored in the management application as the new voice command or the gesture command for quitting the currently executed functions.

Figure 4:
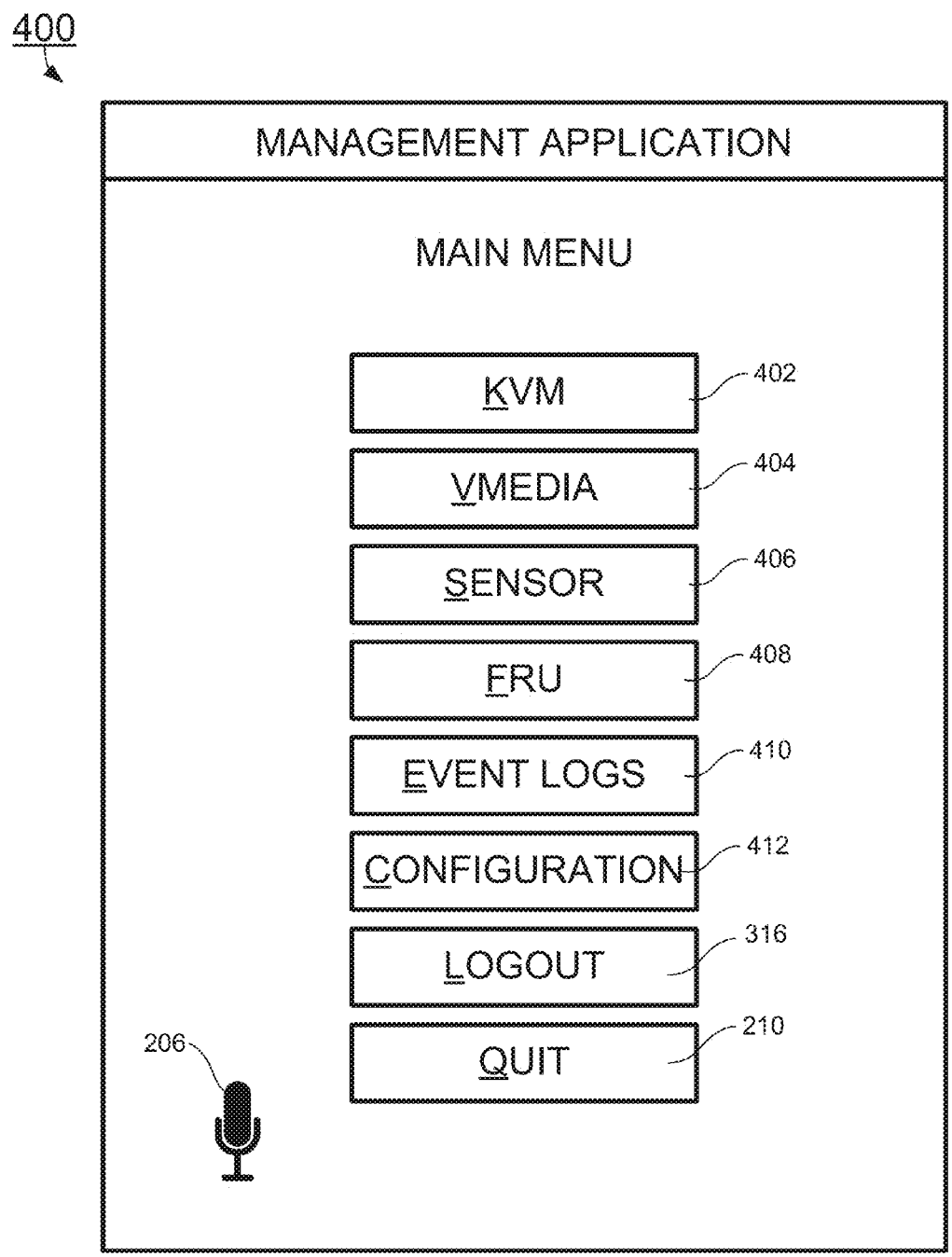
FIG. 4 illustrates an exemplary functions selection main menu user interface according to one embodiment of the present disclosure.

In certain embodiments, after the management application 112 has established a connection with the BMC 120, the management module 9116 then instructs the user interface module 9136 to generate a functions selection main menu user interface 400 as shown in FIG. 4 and display the interface 400 to the user. FIG. 4 illustrates an exemplary functions selection main menu user interface 400 according to one embodiment of the present disclosure. The Main Menu includes following function management options: (a) a KVM option 402, (b) a Virtual Media option 404, (c) a Sensors option 406, (d) a Field Replaceable Unit (FRU) option 408, (e) an Event Logs option 410, and (f) a Configuration option 412.

Further, the main menu user interface 400 and each other user interface can include one or more common options such as a Main Menu option 320, a Logout option 322, a Quit option 210, and a voice input option 206. On each user interface, the user can use the Main Menu option 320 to go to the main menu user interface 400 of the management application 112 as shown in FIG. 4. The user can select the Logout option 322 to logout the management session. The user can select the Quit option 210 to exit the management application 112.

Figure 5A:
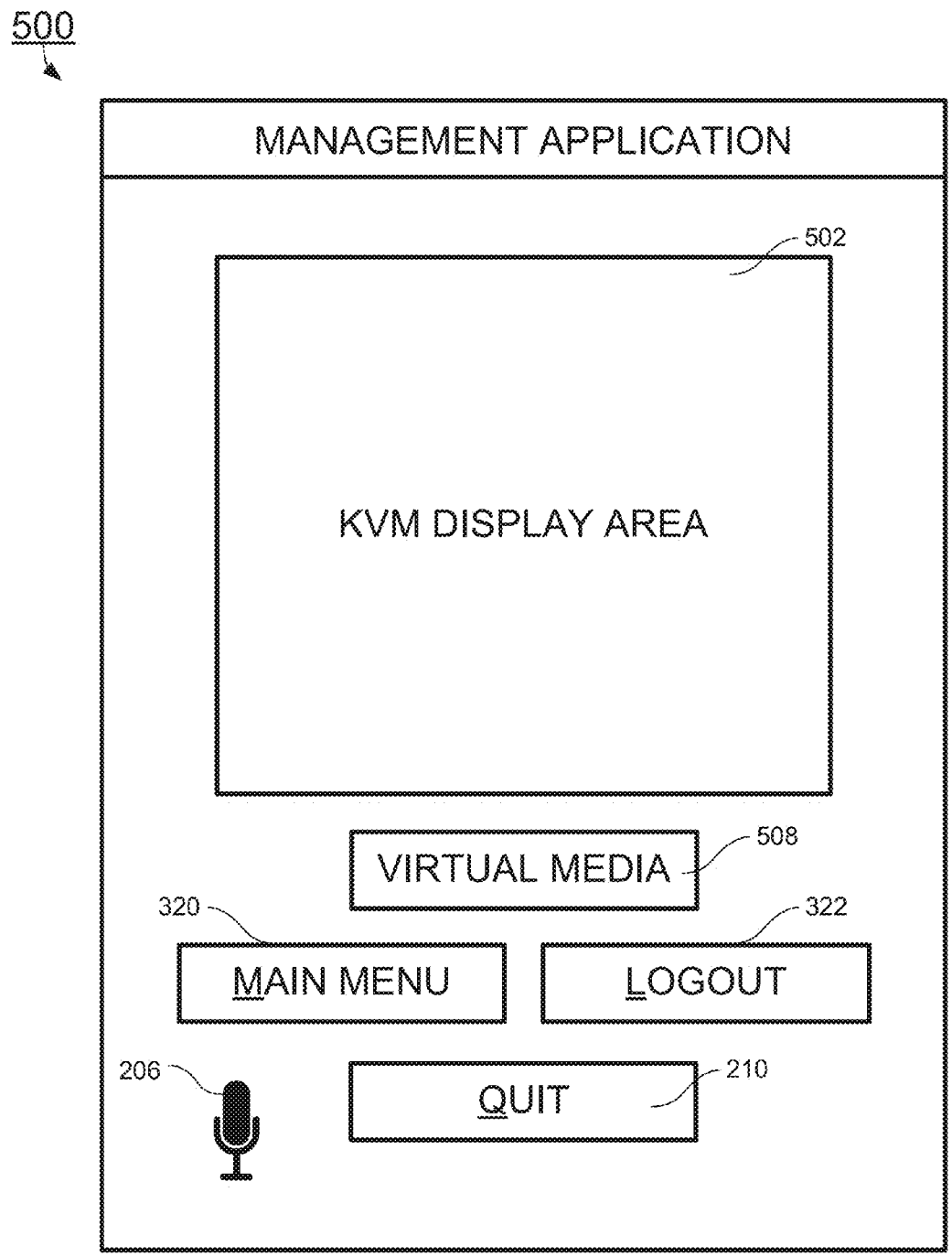
FIG. 5A illustrates an exemplary KVM interface according to one embodiment of the present disclosure.
Figure 5B:
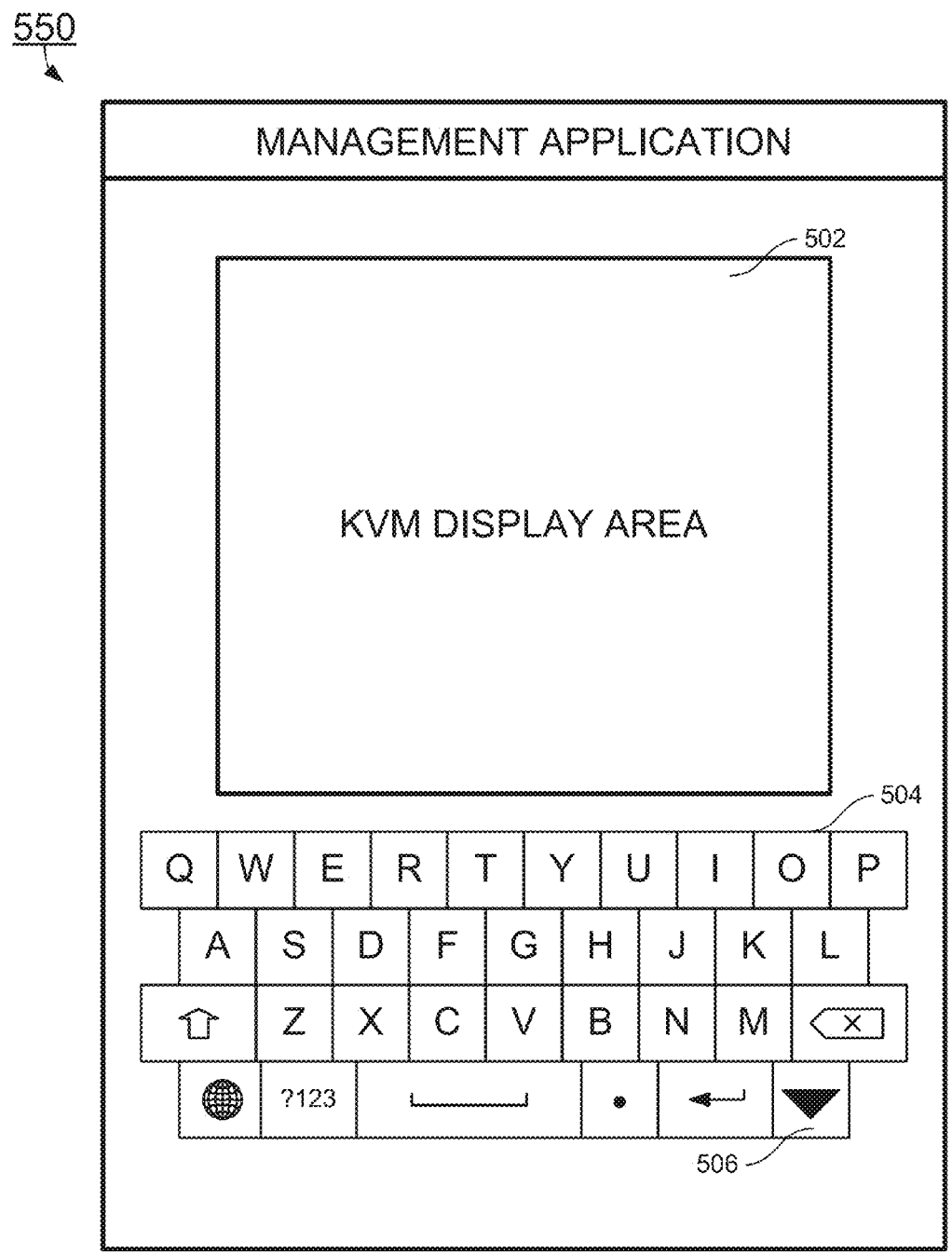
FIG. 5B illustrates an exemplary KVM interface with a keyboard according to one embodiment of the present disclosure.

When the KVM option 402 is selected on the main menu user interface 400 shown in FIG. 4, the management module 9116 can instruct the user interface module 9136 to display a KVM user interface 500 as shown in FIG. 5A or another user interface 550 as shown in FIG. 5B according to certain embodiments of the present disclosure. This option can also be selected by the user through the voice input option 206 by saying the letter "K" as underlined in the KVM option 402 or the word "KVM", or through the gesture input option by writing the letter "K", or the word "KVM" on the touch screen. FIG. 5A illustrates an exemplary KVM user interface 500 in accordance with certain embodiments of the present disclosure. The KVM user interface 500 provides the user the video display at the managed host computer 124 in a KVM display area 502. The KVM user interface 500 also allows the user to use the touch screen on the remote computing device 102 as keyboard and mouse and transmit the keyboard and mouse data to the redirection program 8126 at the BMC. In one embodiment, when the user touches the KVM display area 502, a soft keyboard 504 as shown in FIG. 5B may be displayed to the user. The soft keyboard 504 has a turn off option to allow the user to remove the soft keyboard 504 and go back to the user interface 500. The user can also select the option by directly touch the option on the touch screen. The user can also touch the KVM display area to emulate the function of a mouse. In other words, the input module is able to the receiving user input both for interacting with the management application and for interacting with the managed host computer through KVM redirection. The input module passes the user input for interacting with the managed host computer to the KVM module of the management application. The KVM module converts those user input data to keyboard and mouse data of the managed host computer. For example, the KVM module can convert a single point touch on the KVM display area to mouse data indicating a left click mouse action at a specific location of the video display. The KVM module then sends the keyboard and mouse data directed to the managed host computer to the communication module, which in turn sends those data to the redirection program 8126 at BMC through the network.

In certain embodiments, the KVM user interface also provides an option 506 for selecting the virtual media services. This option 506 can be selected through the voice input option by saying the letter "V" (as underlined in the VMedia) or the phrase "Virtual Media." This option 506 can also be selected through the gesture input option by writing the letter "V", or the phrase "Virtual Media" on the touch screen. The user can also select the option by directly touch the option on the touch screen.

Further, the Virtual Media functions can be selected through the option 504 on the main menu user interface 500. This option can be selected by the user through the voice input option 206 by saying the letter "V" as underlined in the VMedia option 504 or the phrase "Virtual Media", or through the gesture input option by writing the letter "V", or the phrase "Virtual Media" on the touch screen. The user can also select the option by directly touch the option on the touch screen.

Figure 6:
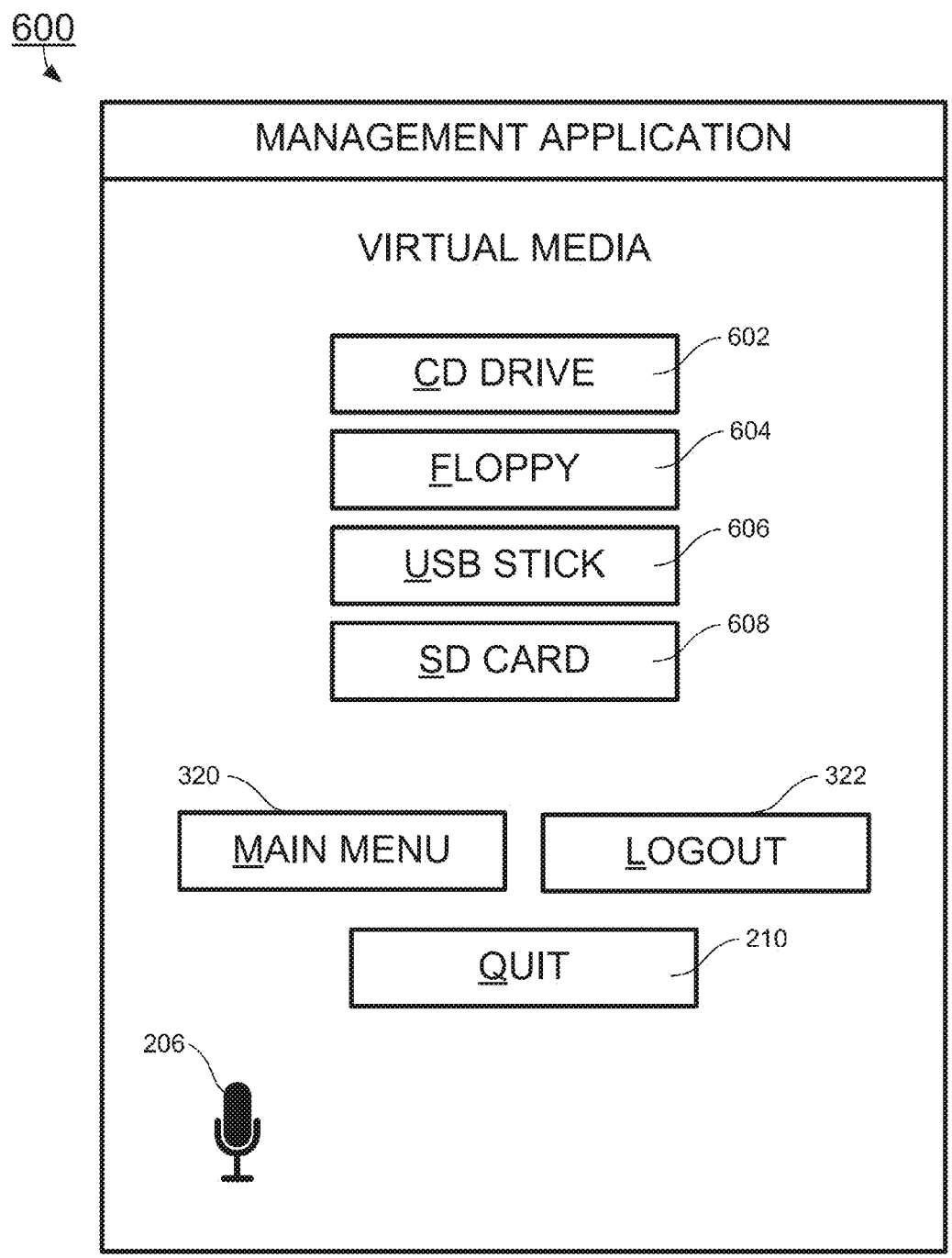
FIG. 6 illustrates an exemplary virtual media interface according to one embodiment of the present disclosure.

Referring now to FIG. 6, an exemplary virtual media user interface 600 is shown according to one embodiment of the present disclosure. Upon receiving an indication that the virtual media service is selected by the user, the management module 9116 can instruct the user interface module 9136 to display the virtual media user interface 600. The virtual media user interface 600 allows the user to select a type of media that is to be emulated by the virtual media program 8130 of the BMC 120 to the managed host computer 124. In other words, through the emulation of the BMC, the managed host computer 124 perceives that the selected type of media with the content from the remote computing device 102 is connected to the managed host computer 124.

In one embodiment, the virtual media user interface 600 includes options:
  (a) a CD Drive option 602, selected by the user through the voice input option 206 by saying the letter "C" as underlined in the CD Drive option 602 or the phrase "CD Drive", or through the gesture input option by writing the letter "C", or the phrase "CD Drive" on the touch screen;
  (b) a Floppy Drive option 604, selected by the user through the voice input option 206 by saying the letter "F" as underlined in the Floppy Drive option 604 or the word "Floppy", or through the gesture input option by writing the letter "F", or the word "Floppy" on the touch screen;
  (c) a USB stick option 606, selected by the user through the voice input option 206 by saying the letter "U" as underlined in the USB Stick option 606 or the phrase "USB Stick", or through the gesture input option by writing the letter "U", or the phrase "USB Stick" on the touch screen; and
  (d) an SD Card option 608, selected by the user through the voice input option 206 by saying the letter "S" as underlined in the SD Card option 608 or the phrase "SD Card", or through the gesture input option by writing the letter "S", or the phrase "SD Card" on the touch screen.

Once the user selects the virtual media, the BMC 120 emulates the selected type of media to the managed host computer 124, and then the managed host computer 124 detects that the selected type of media is connected to itself. The virtual media module 9140 of the management application 112 establishes a communication channel with the BMC 120 and provides to the managed host computer 124 information of the data on the remote computing device 102. The BMC 120 further receives media control command and the data from the managed host computer 124 through the emulated media interface. The BMC 120 further sends corresponding commands to the virtual media module of the management application 112. For example, after the BMC 120 receives a read command from the managed host computer 124 for a specific file or block of data, the BMC 120 then sends commands to the virtual media module 9140 of the management application 112 to request file or data. Upon receiving the command, the virtual media module 9140 locates the requested file or block of data and then utilizes the communication module 9144 to transfer the file or data to the BMC 120. The Main Menu option 320, the Logout option 322, the Quit option 210 and the voice input option 206 remain the same as described above.

Figure 7A:
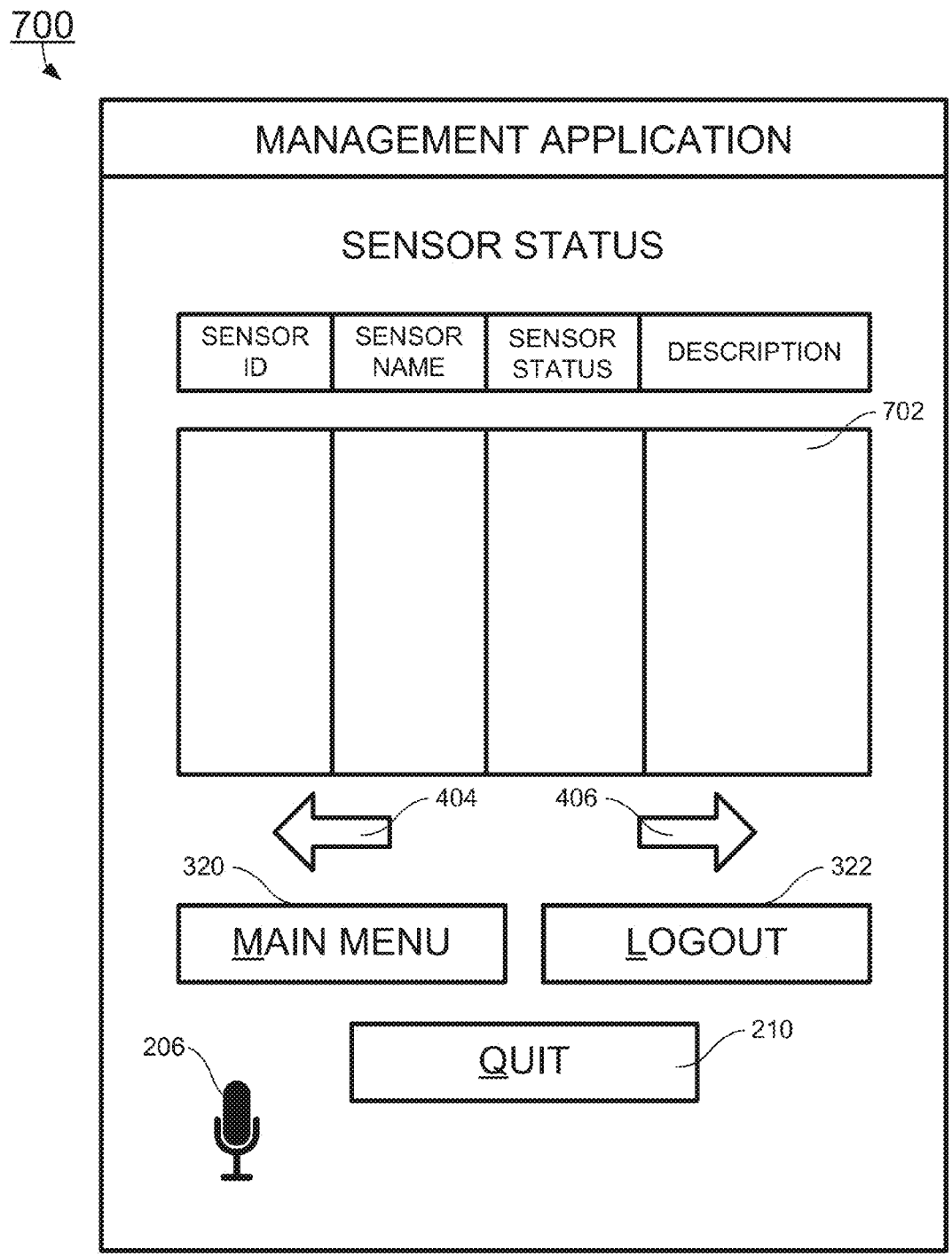
FIG. 7A illustrates an exemplary sensor data display interface according to one embodiment of the present disclosure.

When the Sensors option 406 is selected on the main menu user interface 400, the management module 9116 can instruct the user interface module 9136 to display a sensors information display interface 700. This option can be selected by the user through the voice input option 206 by saying the letter "S" as underlined in the Sensors option 506 or the word "Sensors", or through the gesture input option by writing the letter "S", or the word "Sensors" on the touch screen. The user can also select the option by directly touch the option on the touch screen. FIG. 7A illustrates an exemplary sensor information display interface 700 in accordance with certain embodiments of the present disclosure. The sensor information display interface 700 shows the sensors that are managed by the BMC. A list of all sensors managed by the BMC can be listed in a sensor display area 702 according to one embodiment of the present disclosure.

The sensor display area 702 includes information such as the Sensor ID, the Sensor Name, the Sensor Status, and the description of the Sensor for each listed sensor. The user can browse the sensors as displayed in the sensors display area 702. The user can by using a left arrow 404 to go to a previous sensor on the list of available sensors, and a right arrow 406 to go to the next sensor on the list. The user may press the voice input option 206 and say the word "previous" or the word "next" to browse the previous or the next sensor listed on the list. The user may also use the gesture input option to sweep to the right horizontally to see the previous sensor and to the left horizontally to see the next sensor. Alternatively, if the sensor list is presented vertically, the user may also use the gesture input option to sweep upward vertically to see the next sensor and to downward vertically to see the previous sensor. The Main Menu option 320, the Logout option 322, the Quit option 210 and the voice input option 206 remain the same as described above.

In one embodiment, the user can use the gesture input option to just touch one of the sensors listed on the sensor display area 702 to examine the detailed information related to the sensor. The user also can use the voice input option 206 on the screen to select a sensor to examine the detailed information related to the sensor. For example, the user can press the voice input option 206, and say the word "detail" to open a sensor detail display screen 750 as shown in FIG. 7B to display the detail information of the sensor currently displayed on the sensor display area 702. In this example: when the user selects one of the sensors either through voice input or gesture input, the management application accordingly obtains detailed data, e.g., through a Get Sensor Reading command, for the selected sensor device, and then instruct the user interface module to generate the detailed display interface 750 to display those data.

Figure 8:
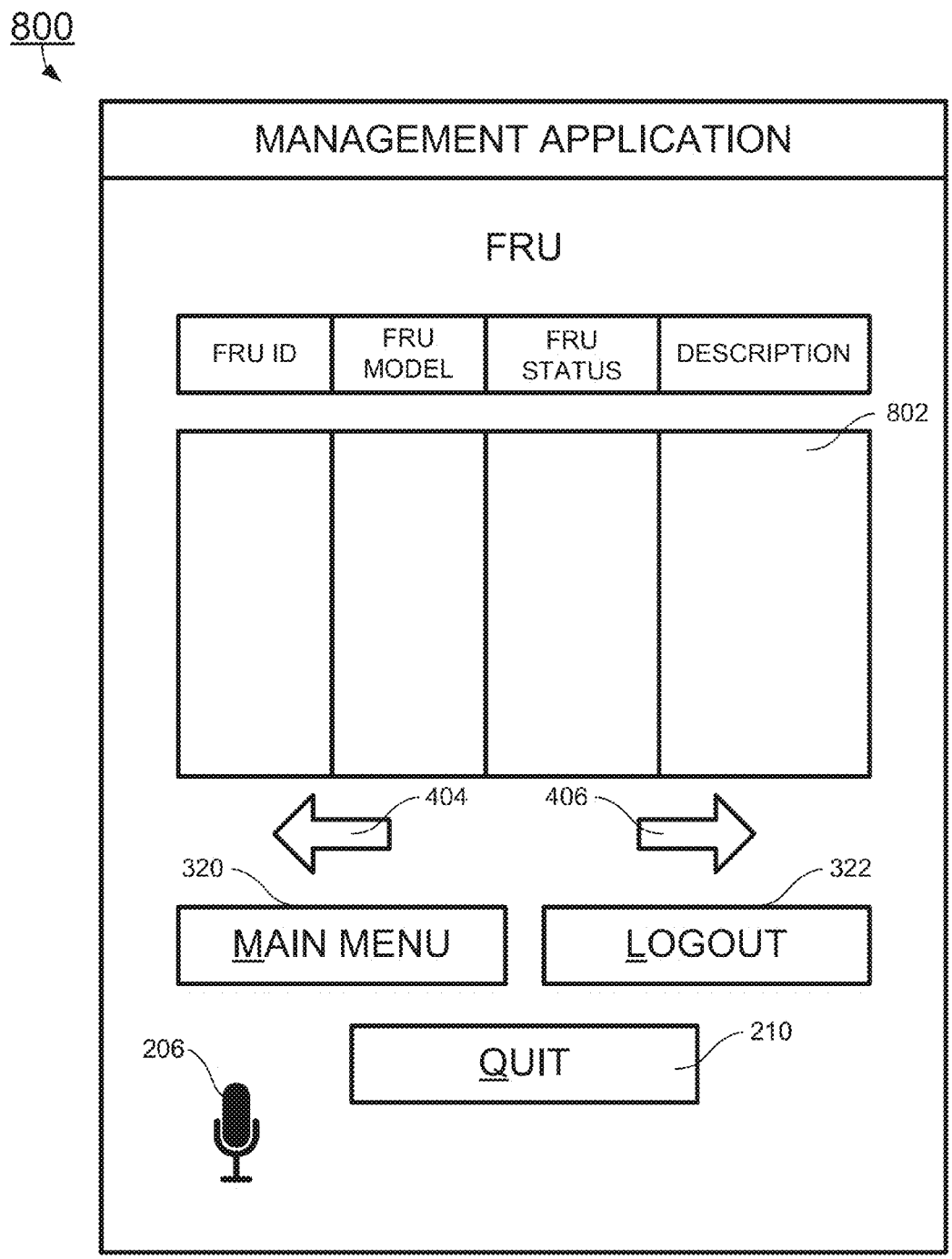
FIG. 8 illustrates a Field Replaceable Unit (FRU) data display interface according to one embodiment of the present disclosure.

Referring now to FIG. 8, an exemplary FRU information display interface 800 is shown in accordance with certain embodiments of the present disclosure. When the FRU option 408 is selected on the main menu user interface 400, the management module 9116 can instruct the user interface module to display a FRU information display interface 800 as shown in FIG. 8. This option can be selected by the user through the voice input option 206 by saying the letter "F" as underlined in the FRU option 408 or the word "FRU", or through the gesture input option by writing the letter "F", or the word "FRU" on the touch screen. The user can also select the option by directly touch the option on the touch screen. The FRU information display interface shows the FRUs managed by the BMC. A list of all FRUs available to the designated BMC is listed in a FRU display area 802 according to one embodiment of the present disclosure.

The FRU display area 802 includes information such as the FRU ID, the FRU Model, the FRU Status, and the description of the FRU for each listed FRUs. The user can browse the FRUs as displayed in the FRU display area 802. The user can by using a left arrow 404 to go to a previous FRU on the list of available FRUs, and a right arrow 406 to go to the next FRU on the list. The user may press the voice input option 206 and say the word "previous" or the word "next" to browse the previous or the next FRU listed on the list. The user may also use the gesture input option to sweep to the right horizontally to see the previous FRU and to the left horizontally to see the next FRU. Alternatively, if the FRU list is presented vertically, the user may also use the gesture input option to sweep upward vertically to see the next FRU and to downward vertically to see the previous FRU. The Main Menu option 320, the Logout option 322, the Quit option 210 and the voice input option 206 remain the same as above.

In one embodiment, the user can use the gesture input option to just touch one of the FRUs listed on the FRU display area 802 to examine the detailed information related to the FRU. The user also can use the voice input option 206 on the screen to select a FRU to examine the detailed information related to the FRU. For example, the user can press the voice input option 206, and say the word "detail" to see a detail display screen (not shown) to display the detail information related to the FRU currently displayed on the FRU display area 802. In this example: when the user selects one of the FRUs either through voice input or gesture input, the management application accordingly obtains detailed data, for the selected FRU device, and then instruct the user interface module 9136 to generate a detailed display screen to display those data.

Figure 9:
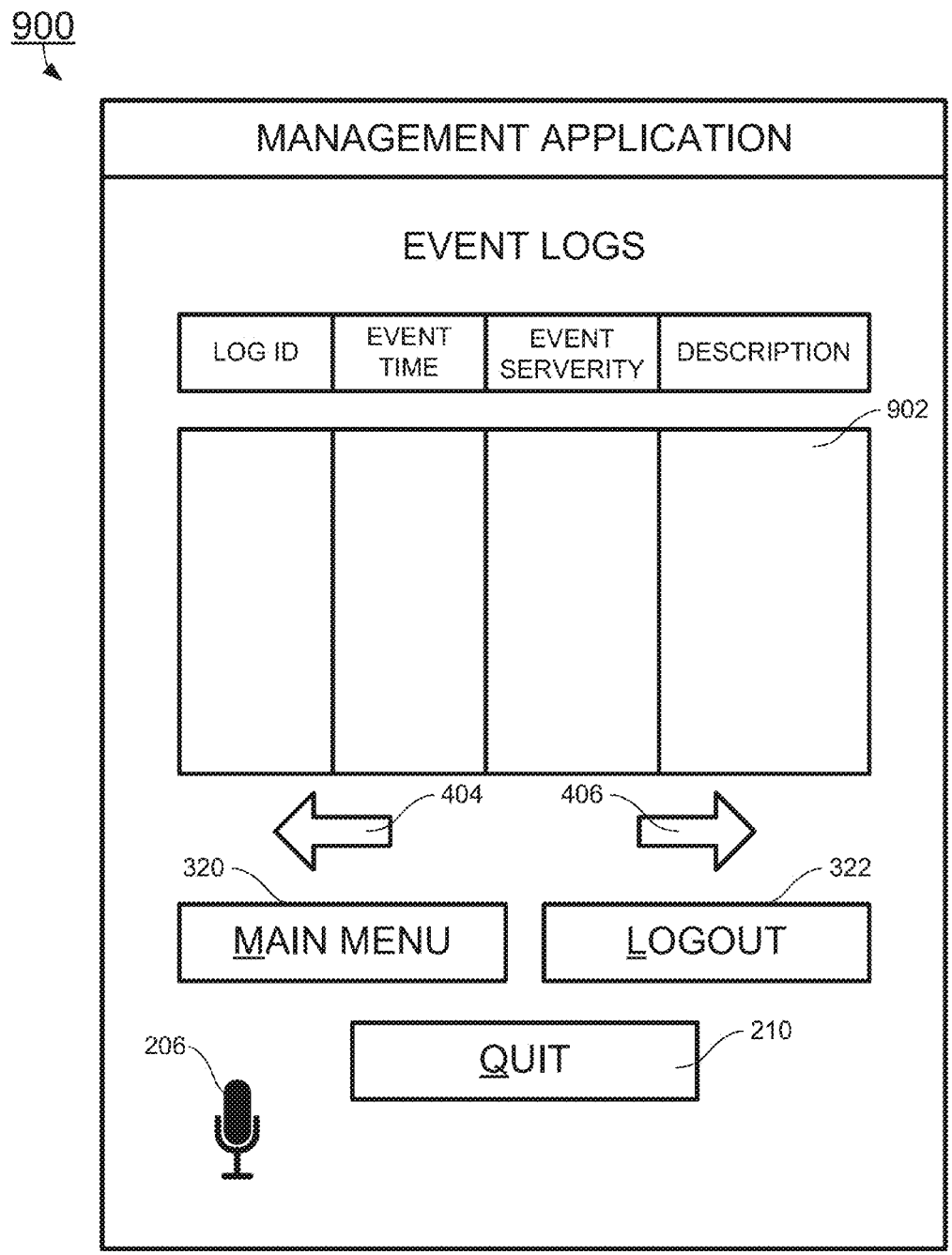
FIG. 9 illustrates a system event log interface according to one embodiment of the present disclosure.

Referring now to FIG. 9, an exemplary event logs user interface 900 is shown according to one embodiment of the present disclosure. When the Event Logs option 410 is selected on the main menu user interface 400, the management module 9116 can instruct the user interface module 9136 to display the event logs user interface 900. This option can be selected by the user through the voice input option 206 by saying the letter "E" as underlined in the Event Logs option 410 or the phrase "event logs", or through the gesture input option by writing the letter "E", or the phrase "event logs" on the touch screen. The user can also select the option by directly touch the option on the touch screen. The event logs user interface shows the Event Logs of the BMC. A list of all event logs available to the designated BMC is listed in an event logs display area 902 according to one embodiment of the present disclosure.

The Event Logs display area 902 includes information such as the Log ID, the Event Time, the Event Severity, and the description of the event for each listed event logs. The user can browse the event logs as displayed in the event logs display area 902. The user can by using a left arrow 404 to go to a previous event log on the list of available event logs, and a right arrow 406 to go to the next event log on the list. The user may press the voice input option 206 and say the word "previous" or the word "next" to browse the previous or the next event log listed on the list. The user may also use the gesture input option to sweep to the right horizontally to see the previous event log and to the left horizontally to see the next event log. Alternatively, if the event log list is presented vertically, the user may also use the gesture input option to sweep upward vertically to see the next event log and to downward vertically to see the previous event log. The Main Menu option 320, the Logout option 322, the Quit option 210 and the voice input option 206 remain the same as described above.

In one embodiment, the user can use the gesture input option to just touch one of the event logs listed on the event log display area 902 to examine the detailed information related to the event. The user also can use the voice input option 206 on the screen to select an event log to examine the detailed information related to the event. For example, the user can press the voice input option 206, and say the word "detail" to see a detail display screen (not shown) to display the detail information related to the event log currently displayed on the event log display area 902. In this example: when the user selects one of the event logs either through voice input or gesture input, the management application accordingly obtains detailed information about the event for the selected event log, and then instruct the user interface to generate a detailed display screen to display those data.

Figure 10:
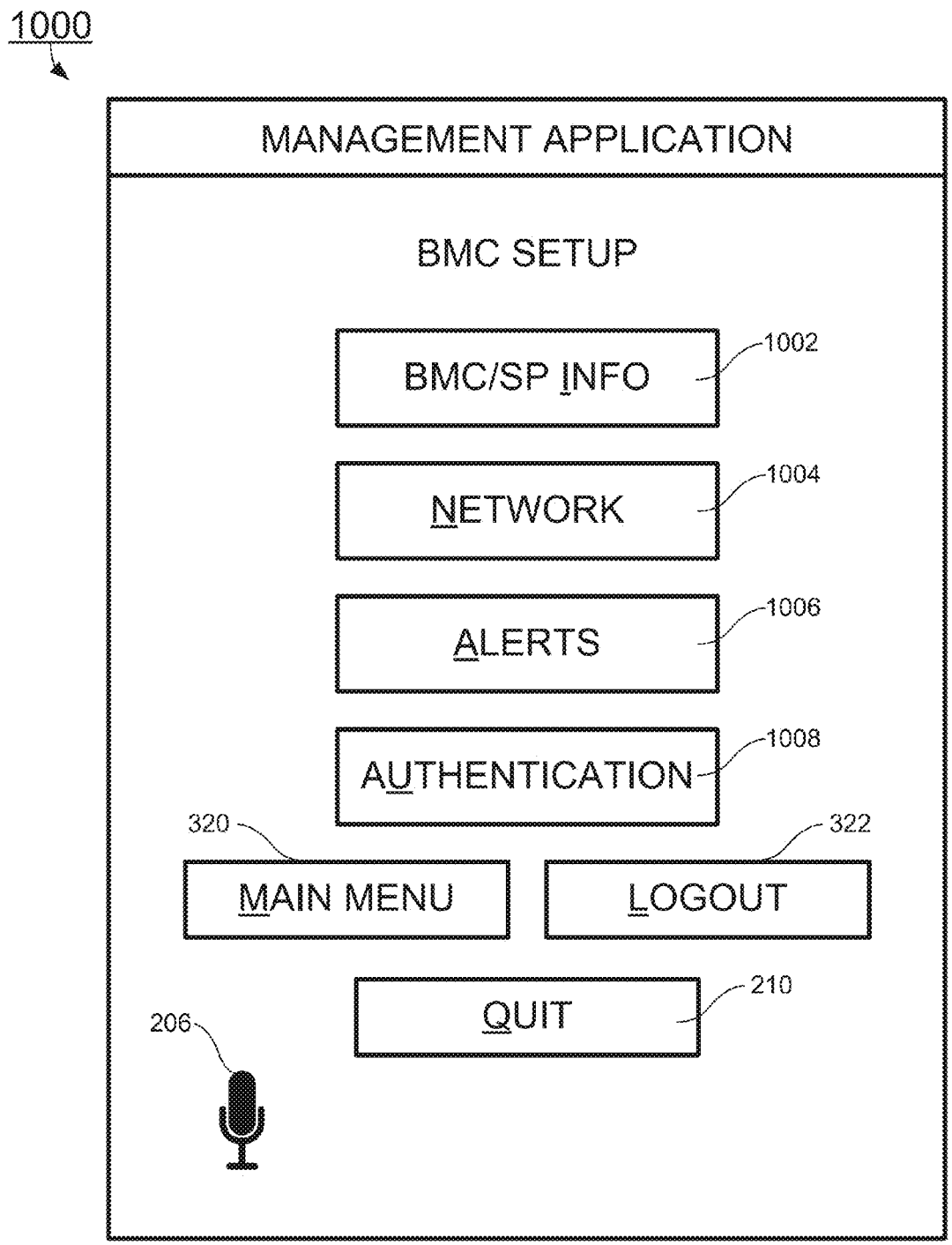
FIG. 10 illustrates a BMC configuration user interface according to one embodiment of the present disclosure.

Referring now to FIG. 10, an exemplary BMC configuration user interface 1000 in accordance with certain embodiments of the present disclosure. When the Configuration option 412 is selected on the main menu user interface 400, the management module 9116 can instruct the user interface module 9136 to display a BMC Configuration user interface 1000. This option can be selected by the user through the voice input option 206 by saying the letter "C" as underlined in the Configuration option 512 or the word "Configuration", or through the gesture input option by writing the letter "C", or the word "Configuration" on the touch screen. The user can also select the option by directly touch the option on the touch screen. The BMC configuration user interface 1000 allows the user to configure the BMC.

The configuration user interface 1000 includes: (a) a BMC/SP INFO configuration option 1002, (b) a Network configuration option 1004, (c) an Alerts configuration option 1006, and (d) an Authentication configuration option 1008.

The BMC/SP INFO configuration option 1002 allows the user to configure detail configuration information related to the designated BMC. This option can be accessed through the voice input option 206 by saying the letter "I" as underlined in the BMC/SP Info option 302 or the word "Info", or through the gesture input option by writing the letter "I", or the word "info" on the touch screen.

The Network configuration option 1004 allows the user to configure how the BMC is to be accessed over the internet, IP address, and/or the BMC name etc. This option can be accessed through the voice input option 206 by saying the letter "N" as underlined in the Network option 1004 or the word "Network", or through the gesture input option by writing the letter "N", or the word "network".

The Alerts configuration option 1006 allows the user to configure detail alert settings, normal operating conditions, and the conditions when the managed host computer 124 exceed the normal operating conditions and warrant an alert to the user. It may also include the methods how the user is to be alerted such as emails, phone calls, or text messages etc. This option can be accessed through the voice input option 206 by saying the letter "A" as underlined in the Alerts option 1006 or the word "Alerts", or through the gesture input option by writing the letter "A", or the word "alerts". The Authentication configuration option 1008 allows the user to configure how the designated BMC is to be managed, who has the ability to access and manage username and corresponding password etc. This option can be accessed through the voice input option 206 by saying the letter "U" as underlined in the Authentication option 308 or the word "authentication", or through the gesture input option by writing the letter "U", or the word "authentication".

The Main Menu option 320, the Logout option 322, the Quit option 210 and the voice input option 206 remain the same as described above. In one embodiment, the user can also directly touch the options listed on the BMC Configuration user interface 1000 to select these options.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope. Accordingly, the scope of the present disclosure is defined by the appended claims rather than the foregoing description and the exemplary embodiments described therein.

What is claimed is:

1. A system, comprising:
    a computer system;
    a baseboard management controller (BMC) communicatively connected to the computer system, wherein the BMC is configured to manage the computer system; and
    a computing device remotely communicatively connected to the BMC through a network, the computing device having:
        a processor,
        an audio input device configured to receive a voice input, and to convert the voice input to audio input data,
        a multitouch device configured to receive a gesture input, to detect multiple touch points simultaneously based on the gesture input, and to convert the detected multiple touch points to multitouch input data, and
        a non-volatile memory storing an application module of a management application,
    wherein the application module, when executed on the processor, is configured to
        display, on the computing device, a first user interface allowing a user to enter a first input, the first input including at least one of the voice input and the gesture input;
        receive input data from the computing device representing the first input, the input data including at least one of the audio input data and the multitouch input data;
        determine, based on the input data, a first command from a plurality of commands targeted to the BMC;
        construct a first message including the determined first command; and
        send the first message from the computing device to the BMC over the network,
    wherein the BMC is configured to receive the first message from the computing device, and to perform the first command to manage the computer system based on the received first message.

2. The system of claim 1, wherein the application module is configured to
    store a plurality of record entries mapped to the plurality of commands, respectively;
    generate an input entry based on the input data;
    compare the input entry to the plurality of record entries and select a first record entry of the plurality of record entries based on the comparison; and
    obtain the first command that is mapped to the first record entry.

3. The system of claim 2, wherein the input data is the audio input data, wherein the plurality of record entries and the input entry each include a text string, wherein the application module is configured to
    recognize, through voice recognition, a first text string from the audio input data and include the first text string in the input entry; and
    match the first text string with the text strings included in the plurality of record entries.

4. The system of claim 2, wherein the input data is the audio input data, wherein the plurality of record entries and the input entry each define a set of audio characteristics, wherein the application module is configured to
    determine a first set of audio characteristics from the input data and use the input entry to define the first set of audio characteristics; and
    compare the first set of audio characteristics with the sets of audio characteristics defined in the plurality of record entries.

5. The system of claim 2, wherein the input data is the multitouch input data, wherein the plurality of record entries and the input entry each define a gesture, wherein the application module is configured to
    recognize, through gesture recognition, a first gesture from the multitouch input data and use the input entry to define the first gesture; and
    match the first gesture with the gestures defined in the plurality of record entries.

6. The system of claim 2, wherein the input data is the multitouch input data, wherein the plurality of record entries and the input entry each define a set of multitouch characteristics, wherein the application module is configured to
    determine a first set of multitouch characteristics from the input data and use the input entry to define the first set of multitouch characteristics; and
    compare the first set of multitouch characteristics with the sets of multitouch characteristics defined in the plurality of record entries.

7. The system of claim 1, wherein the application module is configured to
    encapsulate the first message in at least one first network packet;
    determine a network address of the BMC; and
    transmit the at least one first network packet to the network address through the network.

8. The system of claim 7, wherein the first message is an Intelligent Platform Management Interface ("IPMI") message, wherein the application module is configured to
    receive, from the BMC, at least one second network packet encapsulating an IPMI response message;
    extract the IPMI response message from the second network packets;
    extract response data from the IPMI response message; and
    display a second interface on the computing device, the second interface having the response data.

9. The system of claim 1, wherein the application module comprises:
    a management module configured to manage interactions between the management application and the BMC as well as between the management application and the user;
    an input module configured to
        receive the audio input data from the audio input device of the computing device;
        receive the multitouch input data from the multitouch device of the computing device; and determine, based on the input data, the first command from the plurality of commands;

a user interface module configured to display, as instructed by the management module, user interfaces for interacting with the user, including the first user interface, on a display of the computing device;

a KVM module configured to receive, from the BMC, video output from the computer system redirected by the BMC;

a virtual media module configured to instruct the BMC to emulate a selected type of media to the computer system and to provide data to the computer system through the emulated media;

a message module configured to construct the first message, wherein the first message is an Intelligent Platform Management Interface ("IPMI") message; and a communication module configured to establish a communication channel between the management application and the BMC and to send the first message to the BMC.

10. The system of claim 9, wherein the communication module communicates with the BMC through a TCP/IP socket or a UDP/IP socket.

11. The system of claim 1, wherein the plurality of commands include commands for managing at least one of the following management functions of the BMC: a KVM management function, a Virtual Media management function, a sensors management function, a Field Replaceable Unit (FRU) management function, an Event Log management function, and a configuration management function.

12. The system of claim 1, wherein the plurality of commands include commands for managing at least one of the following devices of the computer system: an IPM Device, a Sensor Device, a SDR Repository Device, a SEL Device, an FRU Inventory Device, an Event Receiver Device, an Event Generator Device, an Application Device, a PEF Device, an Alert Processing Device, and a Chassis Device.

13. The system of claim 1, wherein the application module is configured to
    generate the first user interface, wherein the first user interface shows options that allow the user to select at least one of the voice input and the gesture input to manage the BMC.

14. A method of remote management of a computer system using voice and gesture based input, comprising:
    generating, by an application module of a management application executed at a computing device, a first user interface of the management application, wherein the first user interface shows options that allow a user to select at least one of a voice input and a gesture input for a baseboard management controller (BMC) communicatively connected to the computer system, wherein the computing device is remotely communicatively connected to the BMC through a network, and the BMC is configured to manage the computer system;
    displaying, by the application module on the computing device, the first user interface allowing the user to enter a first input, the first input including at least one of the voice input and the gesture input, wherein the computing device has an audio input device configured to receive the voice input, and to convert the voice input to audio input data, and a multitouch device configured to receive the gesture input, to detect multiple touch points simultaneously based on the gesture input, and to convert the detected multiple touch points to multitouch input data;
    receiving, by the application module, input data from the computing device representing the first input, the input data including at least one of the audio input data and the multitouch input data;
    determining, by the application module based on the input data, a first command from a plurality of commands targeted to the BMC managing the computer system;
    constructing, by the application module, a first message including the determined first command; and
    sending, by the application module, the first message from the computing device to the BMC over the network,
    wherein the BMC is configured to receive the first message from the computing device, and to perform the first command to manage the computer system based on the received first message.

15. The method of claim 14, wherein the application module comprises:
    a management module configured to manage interactions between the management application and the BMC as well as between the management application and the user;
    an input module configured to
        receive the audio input data from the audio input device of the computing device;
        receive the multitouch input data from the multitouch device of the computing device; and
        determine, based on the input data, the first command from the plurality of commands;
    a user interface module configured to display, as instructed by the management module, user interfaces for interacting with the user, including the first user interface, on a display of the computing device;
    a KVM module configured to receive, from the BMC, video output from the computer system redirected by the BMC;
    a virtual media module configured to instruct the BMC to emulate a selected type of media to the computer system and to provide data to the computer system through the emulated media;
    a message module configured to construct the first message, wherein the first message is an Intelligent Platform Management Interface ("IPMI") message; and
    a communication module configured to establish a communication channel between the management application and the BMC and to send the first message to the BMC.

16. The method as claimed in claim 15, wherein the communication module communicates with the BMC through a TCP/IP socket or a UDP/IP socket.

17. The method as claimed in claim 14, wherein the input data is the audio input data, and wherein the method comprises:
    storing a plurality of text record entries mapped to the plurality of commands, respectively;
    generating a text input entry based on the audio input data, wherein the plurality of text record entries and the text input entry each include a text string;
    recognizing, through voice recognition, a first text string from the audio input data and include the first text string in the text input entry;
    matching the first text string with the text strings included in the plurality of text record entries;
    comparing the text input entry to the plurality of text record entries and select a first text record entry of the plurality of text record entries based on the comparison; and
    obtaining the first command that is mapped to the first text record entry.

18. The method as claimed in claim 14, wherein the input data is the multitouch input data, and wherein the method comprises-comprising:
  storing a plurality of multitouch record entries mapped to the plurality of commands, respectively;
  generating a multitouch input entry based on the multitouch input data, wherein the plurality of multitouch record entries and the multitouch input entry each define a set of audio characteristics and a gesture;
  determining a first set of multitouch characteristics from the multitouch input data and using the multitouch input entry to define the first set of multitouch characteristics;
  comparing the first set of multitouch characteristics with the sets of multitouch characteristics defined in the plurality of multitouch record entries;
  recognizing, through gesture recognition, a first gesture from the multitouch input data and using the multitouch input entry to define the first gesture; and
  matching the first gesture with the gestures defined in the plurality of multitouch record entries.

19. The method as claimed in claim 14, further comprising:
  encapsulating, by the application module, the first message in at least one first network packet, wherein the first message is an Intelligent Platform Interface ("IPMI") message;
  determining, by the application module, a network address of the BMC;
  transmitting, by the application module, the at least one first network packet to the network address through the network;
  receiving, from the BMC, at least one second network packet encapsulating an IPMI response message;
  extracting, by the application module, the IPMI response message from the second network packets;
  extracting, by the application module, response data from the IPMI response message; and
  displaying, by the application module, the response data on a second interface on the computing device.

20. A non-transitory computer storage medium having computer-executable instructions stored thereon which, when executed by a processor of a computing device, cause the processor to:
  generate a first user interface showing options that allow a user to select at least one of a voice input and a gesture input for a baseboard management controller (BMC) communicatively connected to a computer system, wherein the computing device is remotely communicatively connected to the BMC through a network, and the BMC is configured to manage the computer system;
  display the first user interface on the computing device for the user to enter a first input, the first input including at least one of the voice input and the gesture input, wherein the computing device has an audio input device configured to receive the voice input, and to convert the voice input to audio input data, and a multitouch device configured to receive the gesture input, to detect multiple touch points simultaneously based on the gesture input, and to convert the detected multiple touch points to multitouch input data;
  receive input data from the computing device representing the first input, the input data including at least one of the audio input data and the multitouch input data;
  determine, based on the input data, a first command from a plurality of commands targeted to the BMC managing the computer system;
  construct a first message including the determined first command; and
  send the first message from the computing device to the BMC over the network,
  wherein the BMC is configured to receive the first message from the computing device, and to perform the first command to manage the computer system based on the received first message.

21. The non-transitory computer storage medium of claim 20, wherein the computer-executable instructions comprise:
  a management module configured to manage interactions between the computing device and the BMC as well as between the computing device and the user;
  an input module configured to
    receive the audio input data from the audio input device of the computing device;
    receive the multitouch input data from the multitouch device of the computing device; and
    determine, based on the input data, the first command from the plurality of commands;
  a user interface module configured to display, as instructed by the management module, user interfaces for interacting with the user, including the first user interface, on a display of the computing device;
  a KVM module configured to receive, from the BMC, video output from the computer system redirected by the BMC;
  a virtual media module configured to instruct the BMC to emulate a selected type of media to the computer system and to provide data to the computer system through the emulated media;
  a message module configured to construct the first message, wherein the first message is an Intelligent Platform Management Interface ("IPMI") message; and
  a communication module configured to establish a communication channel between the computing device and the BMC and to send the first message to the BMC.

22. The non-transitory computer storage medium of claim 21, wherein the communication module communicates with the BMC through a TCP/IP socket or a UDP/IP socket.

23. The non-transitory computer storage medium of claim 20, wherein the input data is the audio input data, and the computer-executable instructions cause the processor to:
  store a plurality of text record entries mapped to the plurality of commands, respectively;
  generate a text input entry based on the audio input data, wherein the plurality of text record entries and the text input entry each include a text string;
  recognize, through voice recognition, a first text string from the audio input data and include the first text string in the text input entry;
  match the first text string with the text strings included in the plurality of text record entries;
  compare the text input entry to the plurality of text record entries and select a first text record entry of the plurality of text record entries based on the comparison; and
  obtain the first command that is mapped to the first text record entry.

24. The non-transitory computer storage medium of claim 20, wherein the input data is the multitouch input data, and the computer-executable instructions cause the processor to:
  store a plurality of multitouch record entries mapped to the plurality of commands, respectively;
  generate a multitouch input entry based on the multitouch input data, wherein the plurality of multitouch record entries and the multitouch input entry each define a set of audio characteristics and a gesture;

determine a first set of multitouch characteristics from the multitouch input data and use the multitouch input entry to define the first set of multitouch characteristics; and compare the first set of multitouch characteristics with the sets of multitouch characteristics defined in the plurality of multitouch record entries;

recognize, through gesture recognition, a first gesture from the multitouch input data and use the multitouch input entry to define the first gesture; and match the first gesture with the gestures defined in the plurality of multitouch record entries.

25. The non-transitory computer storage medium of claim 20, wherein the computer-executable instructions cause the processor to:

encapsulate the first message in at least one first network packet, wherein the first message is an Intelligent Platform Management Interface ("IPMI") message;

determine a network address of the BMC;

transmit the at least one first network packet to the network address through the network;

receive, from the BMC, at least one second network packet encapsulating an IPMI response message;

extract the IPMI response message from the second network packets;

extract response data from the IPMI response message; and display a second interface on the computing device, the second interface having the response data.

* * * * *